US007236836B1

(12) United States Patent
Tanaka et al.

(10) Patent No.: US 7,236,836 B1
(45) Date of Patent: Jun. 26, 2007

(54) SYSTEM FOR SIGNAL PROCESSING AND SIGNAL TRANSMISSION

(75) Inventors: Yoshiaki Tanaka, Fujisawa (JP); Shoji Ueno, Fujisawa (JP)

(73) Assignee: Victor Company of Japan, Ltd., Yokohama (JP)

( * ) Notice: Subject to any disclaimer, the term of this patent is extended or adjusted under 35 U.S.C. 154(b) by 1107 days.

(21) Appl. No.: 09/666,722

(22) Filed: Sep. 20, 2000

(30) Foreign Application Priority Data

| Sep. 29, 1999 | (JP) | 11-275963 |
| Sep. 29, 1999 | (JP) | 11-275964 |
| Sep. 30, 1999 | (JP) | 11-279708 |
| Mar. 31, 2000 | (JP) | 2000-097413 |

(51) Int. Cl.
*G06F 17/00* (2006.01)
*H04J 3/00* (2006.01)
*G11B 3/74* (2006.01)
*G11B 5/09* (2006.01)

(52) U.S. Cl. ............... 700/94; 370/476; 369/89; 369/174

(58) Field of Classification Search ................. 700/94; 370/431, 432, 464, 476; 369/89, 174
See application file for complete search history.

(56) References Cited

U.S. PATENT DOCUMENTS 5,987,417 A * 11/1999 Heo et al. ................... 704/500
6,072,759 A * 6/2000 Maeda et al. ............. 369/59.25
6,137,949 A * 10/2000 Horiguchi et al. ............ 386/82
6,298,025 B1 * 10/2001 McPherson et al. ...... 369/59.21
6,618,396 B1 * 9/2003 Mitui et al. .................. 370/474

FOREIGN PATENT DOCUMENTS

| EP | 0 899 964 | 3/1999 |
| EP | 1 045 390 | 10/2000 |
| EP | 1 087 557 | 3/2001 |
| EP | 1 104 966 | 6/2001 |
| JP | 10-74362 | 3/1998 |
| JP | 10-190705 | 7/1998 |
| JP | 10-285234 | 10/1998 |
| JP | 11-45512 | 2/1999 |
| JP | 11-144375 | 5/1999 |

* cited by examiner

*Primary Examiner*—Sinh Tran
*Assistant Examiner*—Daniel R. Sellers
(74) *Attorney, Agent, or Firm*—Louis Woo

(57) ABSTRACT

A signal processing apparatus includes a device for converting a data stream containing audio packs into packets each having a given area assigned to real data. The audio packs store PCM multiple-channel audio contents information. Another device operates for enabling channel information and a portion of the audio contents information to be placed in adjacent portions of the given area respectively. The channel information corresponds to the portion of the audio contents information.

12 Claims, 26 Drawing Sheets

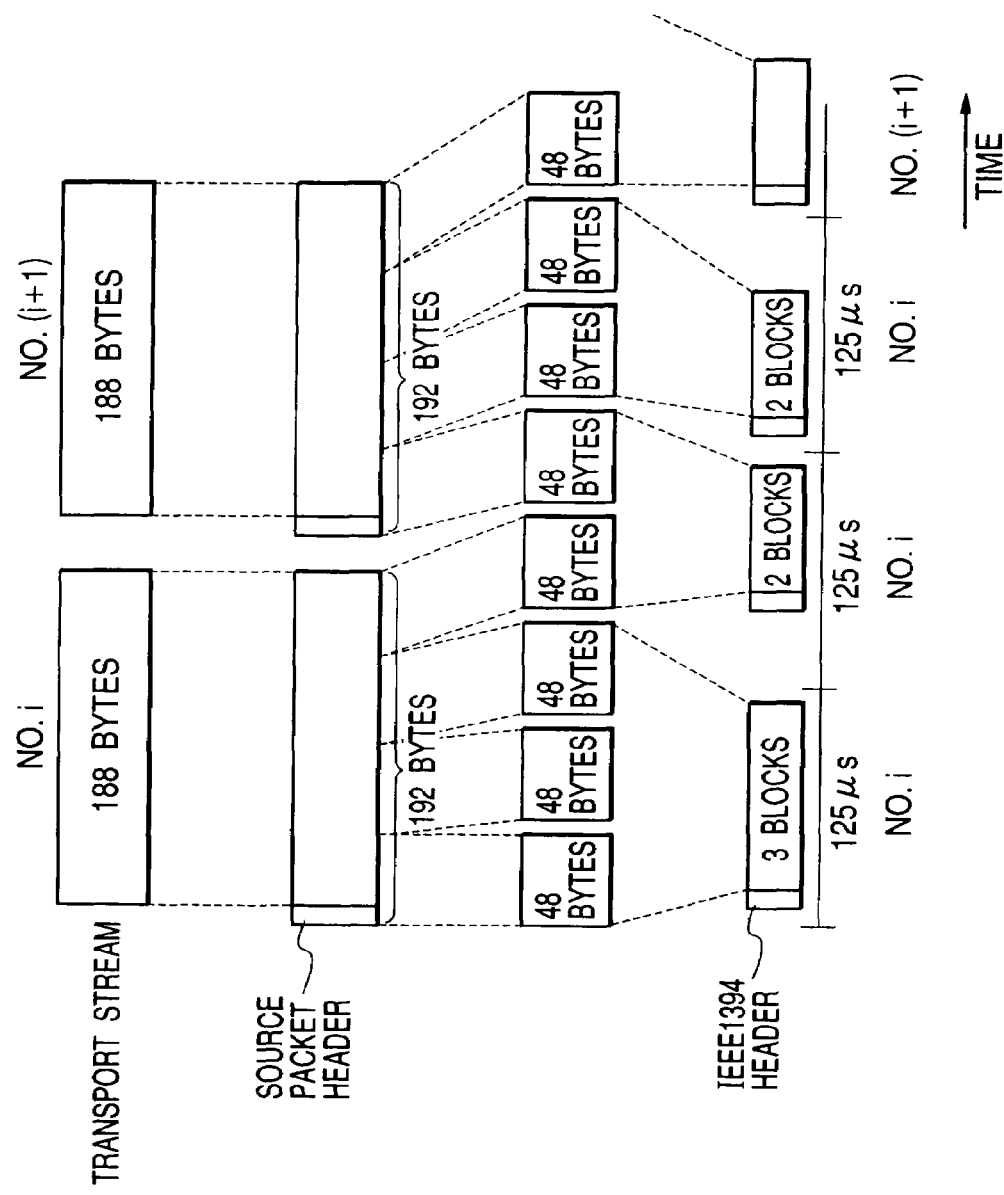

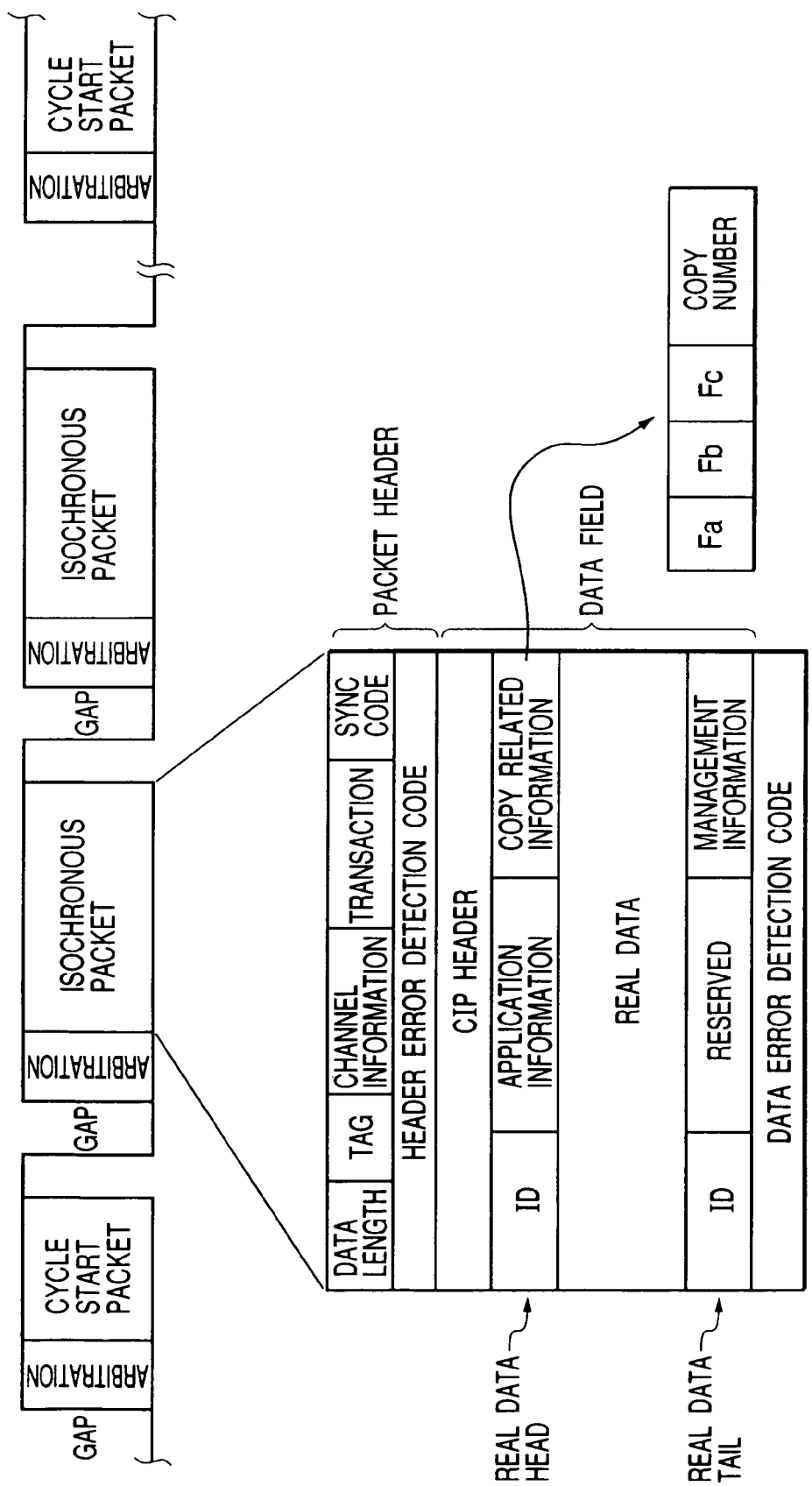

FIG. 14

| ADDRESS | INFORMATION (16 BITS) | ADDRESS | INFORMATION |
|---|---|---|---|
| 7F<br>73 | USER ID | FF<br>.<br>.<br>CF | SOFTWARE PRODUCTION BASIC INFORMATION |
| 72<br>.<br>.<br>4B | TEXT DATA | CE<br>.<br>C8 | MASTER TAPE MANAGEMENT DATA |
| 4A<br>47 | PLAYER INFORMATION | C7<br>.<br>C0 | DISC MANAGEMENT DATA |
| 46<br>41 | COPYRIGHT PROTECTION TERM | BF<br>.<br>.<br>.<br>.<br>.<br>.<br>81 | RESERVED |
| 40 | CONTENTS ID | | |
| 3F<br>30 | ALLOWED USE TERM | | |
| 2F<br>.<br>0D | ENCRYPTION INFORMATION | | |
| 0C | SDCM | | |
| 0B<br>08 | UPC/EAN/JAN CODE | | |
| 07<br>00 | ISRC | 80 | PACKED PCM FLAG |

MULTIPLE-CHANNEL AUDIO DATA (32 BITS)

| CHANNEL CODE | CHANNEL |
|---|---|
| 0h | Lf |
| 1 | Rf |
| 2 | S |
| 3 | Ls |
| 4 | Rs |
| 5 | C |
| 6 | LFE |
| 7–1Fh | |

FIG. 17

| | | | | 32 BITS | |
|---|---|---|---|---|---|
| 0 | 1 | 1 | 0 | Lf (24) | |
| 0 | 1 | 1 | 1 | Rf (24) | |
| 0 | 1 | 1 | 3 | Ls (20) | 0 (4) |
| 0 | 1 | 1 | 4 | Rs (20) | 0 (4) |
| 0 | 1 | 1 | 5 | C (24) | |
| 0 | 1 | 1 | 0 | Lf (24) | |
| 0 | 1 | 1 | 1 | Rf (24) | |
| ⋮ | ⋮ | ⋮ | ⋮ | ⋮ | |

FIG. 18

16-BIT INFORMATION

| GROUP SAMPLING FREQUENCY (4) | MULTIPLE CHANNEL TYPE (4) | CHANNEL ASSIGNMENT INFORMATION (5) | FLAGS (3) |
|---|---|---|---|

FIG. 19

| CHANNEL ASSIGNMENT INFORMATION (BIT PATTERN) | CHANNEL STRUCTURE OF GROUPS 1, 2 | | | | | | CHANNEL NUMBER IN GROUP 1 | CHANNEL NUMBER IN GROUP 2 |
|---|---|---|---|---|---|---|---|---|
| | ACH0 | ACH1 | ACH2 | ACH3 | ACH4 | ACH5 | | |
| 00000b | C(mono) | none | none | none | none | none | 1 | 0 |
| 00001b | L | R | none | none | none | none | 2 | 0 |
| 00010b | Lf | Rf | S | none | none | none | 2 | 1 |
| 00011b | Lf | Rf | Ls | Rs | none | none | 2 | 2 |
| 00100b | Lf | Rf | LFE | none | none | none | 2 | 1 |
| 00101b | Lf | Rf | LFE | S | none | none | 2 | 2 |
| 00110b | Lf | Rf | LFE | Ls | Rs | none | 2 | 3 |
| 00111b | Lf | Rf | C | none | none | none | 2 | 1 |
| 01000b | Lf | Rf | C | S | none | none | 2 | 2 |
| 01001b | Lf | Rf | C | Ls | Rs | none | 2 | 3 |
| 01010b | Lf | Rf | C | LFE | none | none | 2 | 2 |
| 01011b | Lf | Rf | C | LFE | S | none | 2 | 3 |
| 01100b | Lf | Rf | C | LFE | Ls | Rs | 2 | 4 |
| 01101b | Lf | Rf | C | S | none | none | 3 | 1 |
| 01110b | Lf | Rf | C | Ls | Rs | none | 3 | 2 |
| 01111b | Lf | Rf | C | LFE | none | none | 3 | 1 |
| 10000b | Lf | Rf | C | LFE | S | none | 3 | 2 |
| 10001b | Lf | Rf | C | LFE | Ls | Rs | 3 | 3 |
| 10010b | Lf | Rf | Ls | Rs | LFE | none | 4 | 1 |
| 10011b | Lf | Rf | Ls | Rs | C | none | 4 | 1 |
| 10100b | Lf | Rf | Ls | Rs | C | LFE | 4 | 2 |
| OTHERS | RESERVED | | | | | | | |

CHANNEL GROUP 1 ← → CHANNEL GROUP 2

SYSTEM FOR SIGNAL PROCESSING AND SIGNAL TRANSMISSION

BACKGROUND OF THE INVENTION

1. Field of the Invention

This invention relates to a signal processing apparatus. In addition, this invention relates to a method of signal transmission. Furthermore, this invention relates to a signal transmission medium.

2. Description of the Related Art

Japanese published unexamined patent application 10-285234 discloses a signal processing circuit which discriminates a head packet and stores it into a memory in the reception of split packets via a serial interface. The signal processing circuit stores normal data into the memory even when a packet omission takes place. Split packets are transmitted via an IEEE1394 serial bus, a physical layer circuit, and a link core. Values DBC, FN, and DBS are set in a first quadlet of a CIP header of each split packet. The signal processing circuit discriminates a head packet by using values DBC, FN, and DBS therein. In addition, the signal processing circuit decides a packet omission by using values DBC, FN, and DBS. In the case where a packet omission is decided, the signal processing circuit stores only normal packets into a FIFO memory.

Japanese published unexamined patent application 11-45512 discloses that packets inputted from an IEEE1394 serial bus are combined into a transport stream, and the transport stream is converted into a program stream before being recorded on a DVD (a digital versatile disc). During the recording of the program stream on the DVD, a pack length of the program stream and a sector length of the DVD are accorded with each other. In addition, PCR information (time information of the transport stream) is converted into SCR information (time information of the program stream). PSI/SI sections are separated from the transport stream. Attribute information of video and audio data placed in the transport stream is generated from the PSI/SI sections. The attribute information is recorded on an innermost portion of the DVD.

Japanese published unexamined patent application 10-190705 discloses a signal transmission apparatus designed for communications of data of 2,048 bytes through the use of a digital interface of the IEEE1394 standards. A 4-byte time stamp and 124-byte padding data are added to a 2048-byte pack in an MPEG program stream so that the whole byte length of addition-resultant data will be equal to a multiple of 16. The addition-resultant data are divided by a divisor (for example, 32) equal to a multiple of 2, being thereby converted into data blocks each having a byte length (for example, a 68-byte length) equal to a multiple of 4. The number of the data blocks is equal to the divisor. A header such as a CIP header is added to a given number of data blocks to form a packet.

A DVD-Audio has an audio file containing A packs (audio packs), RTI packs (real time information packs), and SPCT packs (still picture packs). Some transmitted contents information has a file structure in which an audio file and a video file are multiplexed. The video file contains V packs (video packs).

In the case where an audio data stream having such a multiplexed file structure and containing multiple-channel audio information is transmitted in conformity with the IEEE1394 standards, it is important to manage audio channels for accurate reproduction of the audio information. In a prior-art digital interface, it is difficult to easily capture channel information. Specifically, in a prior-art IEC958 system, it is difficult to perform channel management related to multiple-channel audio contents.

In the case of transmission of a data stream having a multiplexed file structure, it is desirable to implement a signal formatting process to previously notify a reception side of what decoding process is necessary. Specifically, the signal formatting process is designed to enable a digital interface to identify the type of compression by which compression-resultant data stored in the data stream are generated. Also, in this case, selective reception and efficient reproduction of the information from the data stream are desired. An example of the selective reception is as follows. When received data are of an undecodable type, a reception process is suspended. An example of the efficient reproduction is as follows. A previous decision is made as to whether or not data to be received is of a compressed type, and reproduction of information from the data is implemented in response to a result of the decision.

Generally, data of a DVD-Audio format represent high-quality audio information. In the case of transmission of high-quality audio data, it is important to consider copyright management. It is sometimes desirable to permit making a copy in a manner such that high-quality audio data are converted into low-quality audio data (for example, audio data having a quality comparable to that of a CD) before the low-quality audio data are copied.

SUMMARY OF THE INVENTION

It is a first object of this invention to provide an improved signal processing apparatus.

It is a second object of this invention to provide an improved method of signal transmission.

It is a third object of this invention to provide an improved signal transmission medium.

A first aspect of this invention provides a signal processing apparatus comprising means for converting a data stream containing audio packs into packets each having a given area assigned to real data, the audio packs storing PCM multiple-channel audio contents information; and means for enabling channel information and a portion of the audio contents information to be placed in adjacent portions of the given area respectively, the channel information corresponding to the portion of the audio contents information.

A second aspect of this invention provides a signal processing apparatus comprising means for receiving packets each having a given area assigned to real data, the packets resulting from conversion of a data stream containing audio packs storing PCM multiple-channel audio contents information, channel information and a portion of the audio contents information being placed in adjacent portions of the given area respectively, the channel information corresponding to the portion of the audio contents information; and means for decoding the channel information.

A third aspect of this invention provides a method of signal transmission. The method comprises the steps of converting a data stream containing audio packs into packets each having a given area assigned to real data, the audio packs storing PCM multiple-channel audio contents information; enabling channel information and a portion of the audio contents information to be placed in adjacent portions of the given area respectively, the channel information corresponding to the portion of the audio contents information; and transmitting the packets via a serial interface.

A fourth aspect of this invention provides a signal transmission medium comprising means for converting a data stream containing audio packs into packets each having a given area assigned to real data, the audio packs storing PCM multiple-channel audio contents information; means for enabling channel information and a portion of the audio contents information to be placed in adjacent portions of the given area respectively, the channel information corresponding to the portion of the audio contents information; and means for transmitting the packets from a transmission side to a reception side via a serial interface.

A fifth aspect of this invention provides a signal processing apparatus comprising means for converting a data stream containing an audio data stream into packets each having a given area assigned to real data, the audio data stream storing audio data resulting from a compression process; and means for enabling compression information to be placed in the given area, the compressing information representing a type of the compression process.

A sixth aspect of this invention provides a signal processing apparatus comprising means for receiving packets each having a given area assigned to real data, the packets resulting from conversion of a data stream containing an audio data stream storing audio data resulting from a compression process, compression information being placed in the given area, the compression information representing a type of the compression process; and means for decoding the compression information.

A seventh aspect of this invention provides a method of signal transmission. The method comprises the steps of converting a data stream containing an audio data stream into packets each having a given area assigned to real data, the audio data stream storing audio data resulting from a compression process; enabling compression information to be placed in the given area, the compression information representing a type of the compression process; and transmitting the packets via a serial interface.

An eighth aspect of this invention provides a signal transmission medium comprising means for converting a data stream containing audio packs into packets each having a given area assigned to real data, the audio packs storing audio data resulting from a compression process; means for enabling compression information to be placed in the given area, the compression information representing a type of the compression process; and means for transmitting the packets from a transmission side to a reception side via a serial interface.

A ninth aspect of this invention provides a signal processing apparatus comprising means for converting a data stream containing audio packs into packets each having a given area; and means for enabling at least one of a down sampling flag, a down mix flag, and a dequantization flag to be placed in the given area.

A tenth aspect of this invention is based on the ninth aspect thereof, and provides a signal processing apparatus further comprising means for down-sampling and dequantizing main data into processing-resultant data, means for receiving a transmission request, and means for loading the packets with the processing-resultant data and transmitting the packets in response to the received transmission request.

An eleventh aspect of this invention provides a signal processing apparatus comprising means for receiving packets each having a given area, the packets resulting from conversion of a data stream containing audio packs, wherein at least one of a down sampling flag, a down mix flag, and a dequantization flag is placed in the given area; and means for decoding the at least one of the down sampling flag, the down mix flag, and the dequantization flag.

A twelfth aspect of this invention provides a method of signal transmission. The method comprises the steps of converting a data stream containing audio packs into packets each having a given area; enabling at least one of a down sampling flag, a down mix flag, and a dequantization flag to be placed in the given area; and transmitting the packets via a serial interface.

A thirteenth aspect of this invention is based on the twelfth aspect thereof, and provides a method further comprising the steps of down-sampling and dequantizing main data into processing-resultant data, receiving a transmission request, and loading the packets with the processing-resultant data and transmitting the packets in response to the received transmission request.

A fourteenth aspect of this invention provides a signal transmission medium comprising means for converting a data stream containing audio packs into packets each having a given area; means for enabling at least one of a down sampling flag, a down mix flag, and a dequantization flag to be placed in the given area; and means for transmitting the packets from a transmission side to a reception side via a serial interface.

A fifteenth aspect of this invention provides a signal processing apparatus comprising means for converting a data stream containing audio packs into packets each having a given area assigned to real data, the audio packs storing audio data resulting from an encoding process; and means for enabling encoding information to be placed in the given area, the encoding information representing a type of the encoding process.

A sixteenth aspect of this invention provides a signal processing apparatus comprising means for receiving packets each having a given area assigned to real data, the packets resulting from conversion of a data stream containing audio packs storing audio data resulting from an encoding process, encoding information being placed in the given area, the encoding information representing a type of the encoding process; and means for decoding the encoding information.

A seventeenth aspect of this invention provides a method of signal transmission. The method comprises the steps of converting a data stream containing audio packs into packets each having a given area assigned to real data, the audio packs storing audio data resulting from an encoding process; enabling encoding information to be placed in the given area, the encoding information representing a type of the encoding process; and transmitting the packets via a serial interface.

An eighteenth aspect of this invention provides a signal transmission medium comprising means for converting a data stream containing audio packs into packets each having a given area assigned to real data, the audio packs storing audio data resulting from an encoding process; means for enabling encoding information to be placed in the given area, the encoding information representing a type of the encoding process; and means for transmitting the packets from a transmission side to a reception side via a serial interface.

A nineteenth aspect of this invention is based on the eighteenth aspect thereof, and provides a signal transmission medium wherein the encoding process comprises a 1-bit DSD encoding process.

A twentieth aspect of this invention is based on the fourteenth aspect thereof, and provides a signal transmission medium wherein the down sampling flag indicates halving an original sampling frequency.

A twenty-first aspect of this invention is based on the eighth aspect thereof, and provides a signal transmission medium wherein the compression information comprises information representing that DSD encoded data are compressed by a predetermined compression process.

BRIEF DESCRIPTION OF THE DRAWINGS

FIG. 12 is a time-domain diagram of signals which occur during signal conversion for isochronous transmission conforming to the IEEE1394 standards.

FIG. 13 is a diagram of a cycle start packet, an isochronous packet, and a data structure of the isochronous packet.

FIG. 14 is a diagram of the details of management information in a real data tail in FIG. 13.

FIG. 17 is a diagram of an example of the real data in FIG. 13 which have a set of 32-bit segments each corresponding to 32-bit multiple-channel audio data in FIG. 15.

FIG. 18 is a diagram of a structure of 16-bit information containing channel information in a fourth embodiment of this invention.

FIG. 19 is a diagram of channel assignment.

DESCRIPTION OF THE PREFERRED EMBODIMENTS

First Embodiment

Figure 1:
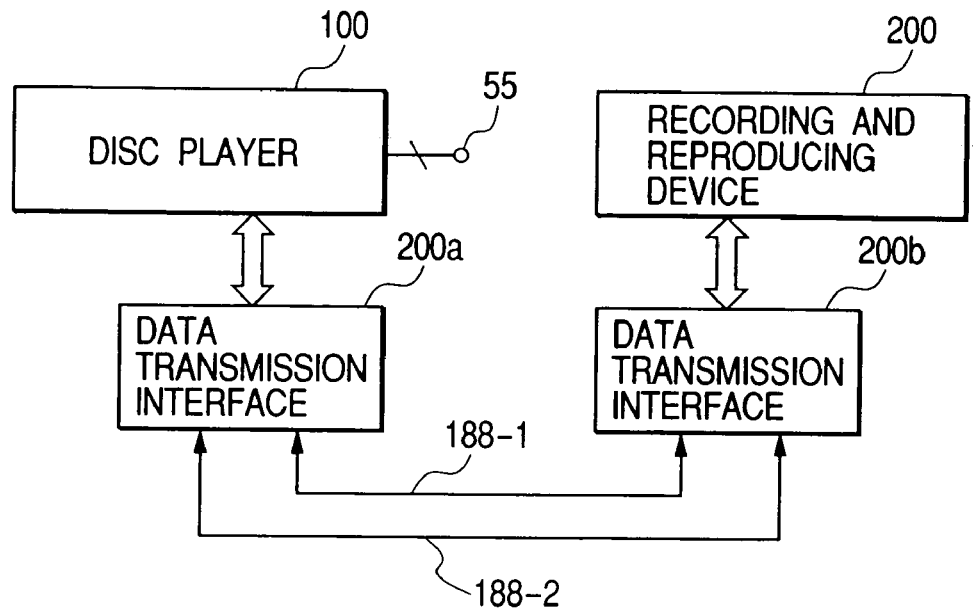
FIG. 1 is a block diagram of a signal processing apparatus according to a first embodiment of this invention.

FIG. 1 shows a signal processing apparatus according to a first embodiment of this invention. The signal processing apparatus of FIG. 1 includes a disc player 100 and a recording and reproducing device 200. The disc player 100 operates as a transmitter being a center of a domestic information network. The recording and reproducing device 200 operates as a reception terminal.

The disc player 100 is connected to a data transmission interface 200a. It should be noted that the data transmission interface 200a may be provided in the disc player 100. The recording and reproducing device 200 is connected to a data transmission interface 200b. It should be noted that the data transmission interface 200b may be provided in the recording and reproducing device 200. The data transmission interfaces 200a and 200b are connected to each other via two IEEE1394 serial interfaces 188-1 and 188-2 including IEEE1394 serial buses.

The disc player 100 reads out an audio signal, a still picture signal, and a real time information signal from a DVD-Audio. The disc player 100 may also read out a video signal from the DVD-Audio. The disc player 100 transmits the audio signal, the still picture signal, and the real time information signal to the recording and reproducing device 200 via the data transmission interface 200a, the serial interfaces 188-1 and 188-2, and the data transmission interface 200b. Also, the disc player 100 may transmit the video signal. The disc player 100 and the recording and reproducing device 200 communicate with each other via the data transmission interface 200a, the serial interfaces 188-1 and 188-2, and the data transmission interface 200b.

It is preferable that as viewed from the disc player 100, one of the serial interfaces 188-1 and 188-2 is used exclusively for signal transmission to the recording and reproducing device 200, and the other serial interface is used selectively for signal transmission to the recording and reproducing device 200 and signal reception therefrom.

The disc player 100 includes a controller having a microcomputer, a CPU, or a similar device. The controller operates in accordance with a control program stored in its internal ROM. The controller can access the data transmission interface 200a. The controller can access the serial interfaces 188-1 and 188-2 via the data transmission interface 200a. The controller may directly access the serial interfaces 188-1 and 188-2. The controller is able to control the data transmission interface 200a and the serial interfaces 188-1 and 188-2. Different identification (ID) numbers are assigned to the serial interfaces 188-1 and 188-2, respectively. The controller can discriminate the serial interfaces 188-1 and 188-2 from each other by referring to the ID numbers thereof.

The disc player 100 can be connected to an external loudspeaker and an external display via an output terminal 55 for monitor. The audio signal can be transmitted from the disc player 100 to the loudspeaker via the output terminal 55, being converted into corresponding sounds by the loudspeaker. Each of the video signal, the still picture signal, and the real time information signal can be transmitted from the disc player 100 to the display via the output terminal 55, being visualized by the display.

Figure 2:
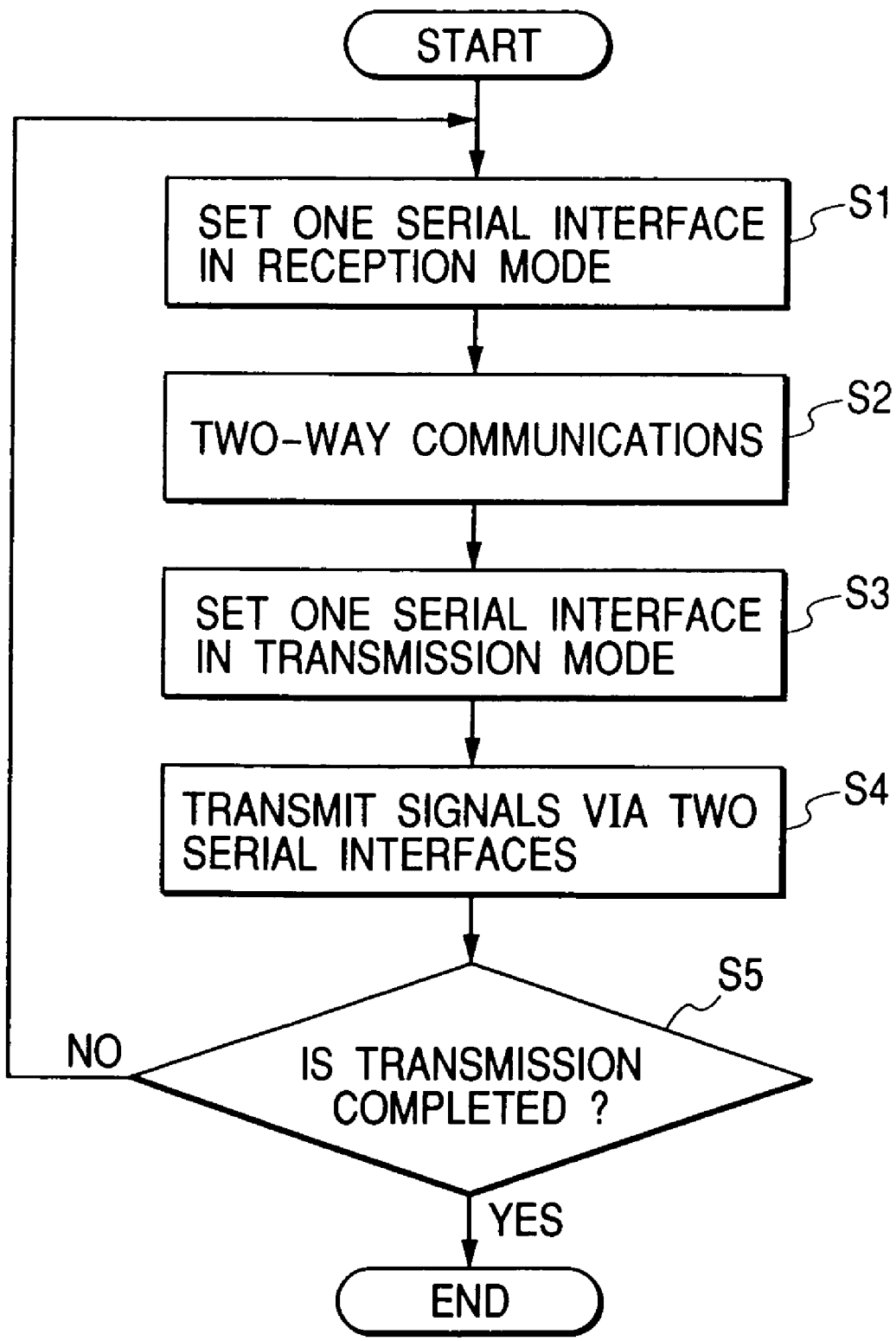
FIG. 2 is a flowchart of a segment of a control program for a controller within a disc player in FIG. 1.

FIG. 2 is a flowchart of a segment of the control program for the controller within the disc player 100. With reference to FIG. 2, a first step S1 of the program segment sets the serial interface 188-1 in a receiving operation mode as viewed from the disc player 100. Furthermore, the step S1 sets the serial interface 188-2 in a transmitting operation mode as viewed from the disc player 100.

A step S2 following the step S1 implements two-way communications with the data transmission interface 200b (the recording and reproducing device 200) via the data transmission interface 200a and the serial interfaces 188-1 and 188-2. During the two-way communication, operation command signals such as a play command signal and a disc request signal are transmitted.

A step S3 subsequent to the step S2 changes the serial interface 188-1 to a transmitting operation mode as viewed from the disc player 100.

A step S4 following the step S3 transmits plural signals to the data transmission interface 200b (the recording and reproducing device 200) via the data transmission interface 200a and the serial interfaces 188-1 and 188-2. The plural signals include high-transfer-rate signals reproduced from a DVD-Audio. Examples of the high-transfer-rate signals are an audio signal, a real time information signal, and a still picture signal. The step S4 assigns the transmission of at least first one of the high-transfer-rate signals to the serial interface 188-1. The step S4 assigns the transmission of at least second one of the high-transfer-rate signals to the serial interface 188-2. For example, the transmission of an audio signal is assigned to the serial interface 188-1 while the transmission of a real time information signal and a still picture signal is assigned to the serial interface 188-2. In the case where the audio signal, the real time information signal, and the still picture signal are synchronously reproduced, the distributed signal transmission removes a significant limitation on a buffer capacity so that a lot of still pictures (for example, 80 to 99 still pictures) can be reproduced synchronously with audio information.

A step S5 subsequent to the step S4 decides whether or not the signal transmission has been completed. When the signal transmission has been completed, the program exits from the step S5 and then the current execution cycle of the program segment ends. When the signal transmission has not been completed yet, the program returns from the step S5 to the step S1.

It should be noted that the IEEE1394 transmission system may be replaced by a transmission system using an audio-related format conforming to the IEC958 standards. The audio-related format conforming to the IEC958 standards may be an IEC958 mode audio-related format prescribed in the IEEE standards.

Second Embodiment

Figure 3:
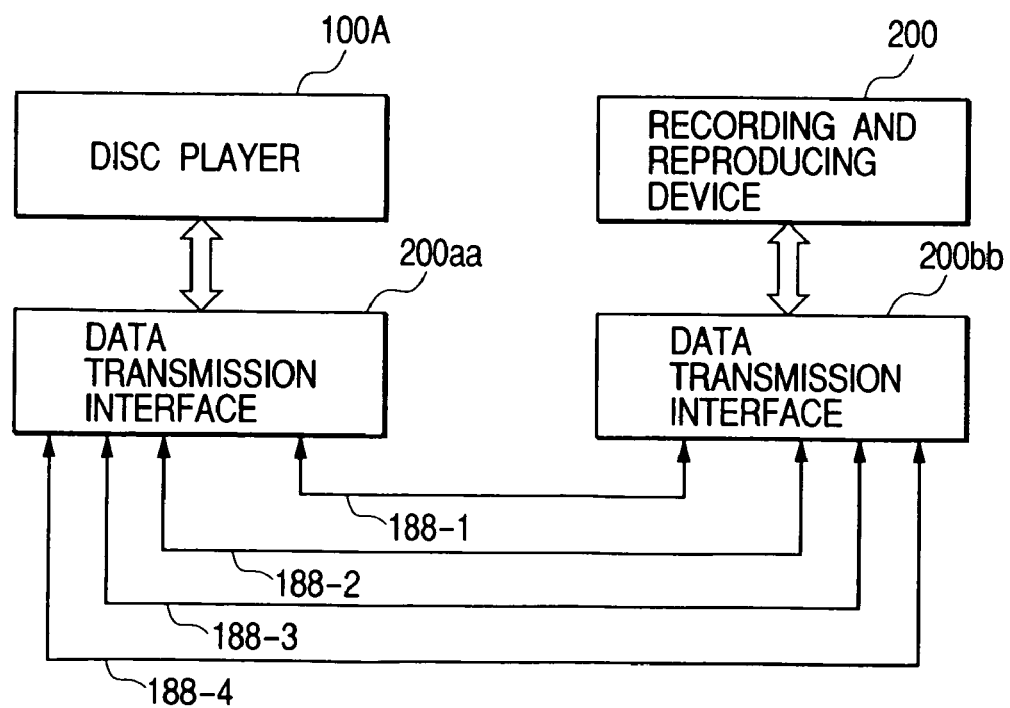
FIG. 3 is a block diagram of a signal processing apparatus according to a second embodiment of this invention.

FIG. 3 shows a signal processing apparatus according to a second embodiment of this invention. The signal processing apparatus of FIG. 3 is similar to the signal processing apparatus of FIG. 1 except for design changes indicated hereinafter.

The signal processing apparatus of FIG. 3 includes a disc player 100A instead of the disc player 100 (see FIG. 1). The signal processing apparatus of FIG. 3 includes data transmission interfaces 200aa and 200bb replacing the data transmission interfaces 200a and 200b respectively. The data transmission interfaces 200aa and 200bb are connected to each other via four IEEE1394 serial interfaces 188-1, 188-2, 188-3, and 188-4 including IEEE1394 serial buses.

Figure 4:
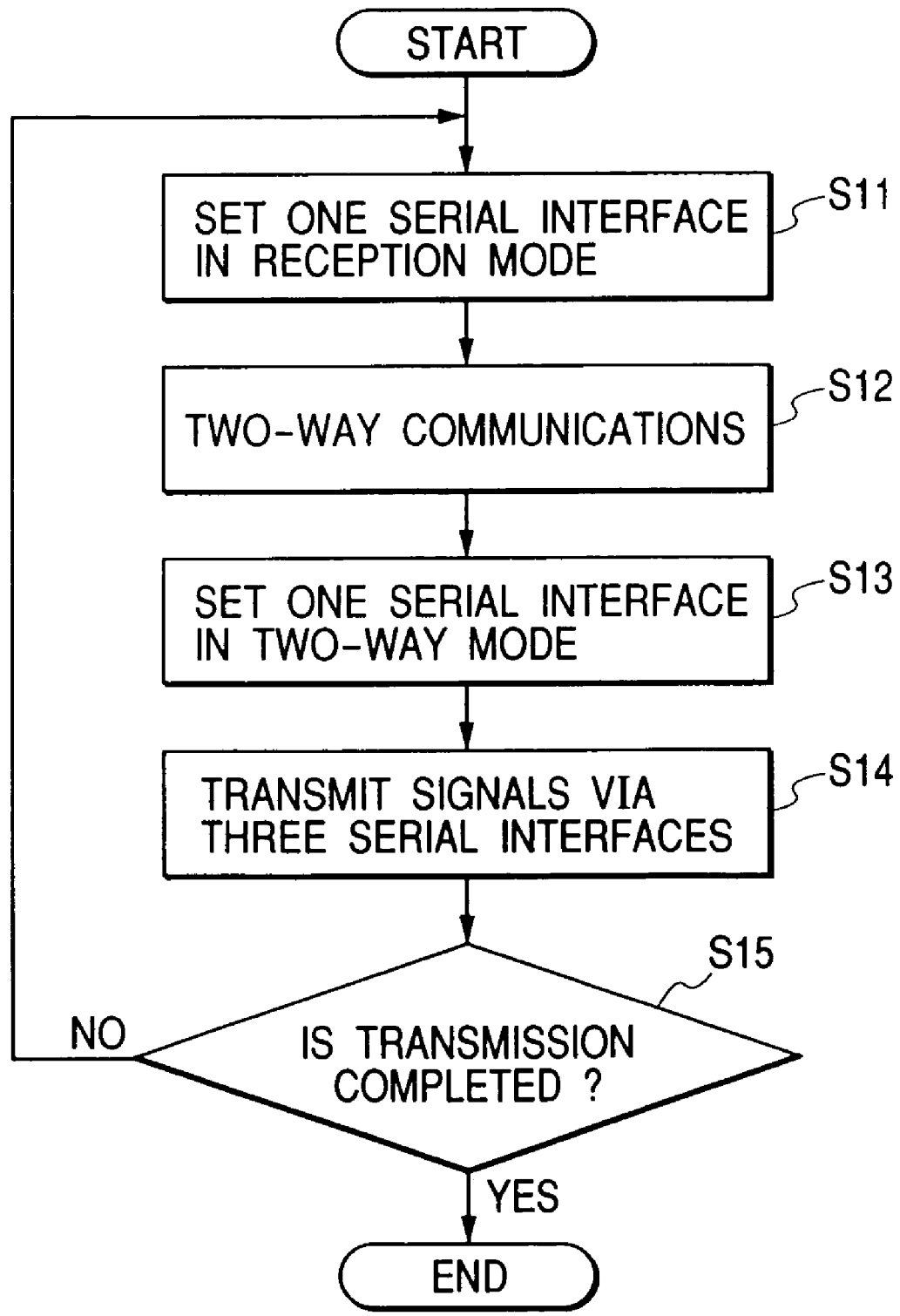
FIG. 4 is a flowchart of a segment of a control program for a controller within a disc player in FIG. 3.

FIG. 4 is a flowchart of a segment of a control program for a controller within the disc player 100A. With reference to FIG. 4, a first step S11 of the program segment sets the serial interface 188-1 in a receiving operation mode as viewed from the disc player 100A. Furthermore, the step S11 sets the serial interfaces 188-2, 188-3, and 188-3 in a transmitting operation mode as viewed from the disc player 100A.

A step S12 following the step S11 implements two-way communications with the data transmission interface 200bb (the recording and reproducing device 200) via the data transmission interface 200a and the serial interfaces 188-1 and 188-2.

A step S13 subsequent to the step S12 changes the serial interface 188-1 to a two-way communication mode.

A step S14 following the step S13 transmits plural signals to the data transmission interface 200bb (the recording and reproducing device 200) via the data transmission interface 200aa and the serial interfaces 188-2, 188-3, and 188-4. The plural signals include high-transfer-rate signals reproduced from a DVD-Audio. Examples of the high-transfer-rate signals are an audio signal, a real time information signal, and a still picture signal. The step S14 assigns the transmission of at least first one of the high-transfer-rate signals to the serial interface 188-2. The step S14 assigns the transmission of at least second one of the high-transfer-rate signals to the serial interface 188-3. The step S14 assigns the transmission of at least third one of the high-transfer-rate signals to the serial interface 188-4. For example, the transmission of an audio signal is assigned to the serial interface 188-2, and the transmission of a real time information signal and the transmission of a still picture signal are assigned to the serial interfaces 188-3 and 188-4 respectively.

In addition, the step S14 implements two-way communications with the data transmission interface 200bb (the recording and reproducing device 200) via the data transmission interface 200a and the serial interface 188-1. During the two-way communications, operation-related data are transmitted.

A step S15 subsequent to the step S14 decides whether or not the signal transmission has been completed. When the signal transmission has been completed, the program exits from the step S15 and then the current execution cycle of the program segment ends. When the signal transmission has not been completed yet, the program returns from the step S15 to the step S11.

Third Embodiment

A signal processing apparatus of a third embodiment of this invention is similar to the signal processing apparatus of FIG. 1 or FIG. 3 except for additional designs indicated hereinafter.

A transmission side (the disc player 100 or 100A) includes a microcomputer-based controller or a CPU-based controller which controls operation of the transmission side. Similarly, a reception side (the recording and reproducing device 200) includes a microcomputer-based controller or a CPU-based controller which controls operation of the reception side.

Main data (contents information) to be sent from the transmission side to the reception side result from compression of original data. The transmission side generates a flag representing whether or not the data compression is of the DVD-Audio lossless type. The compression type flag is placed in management information within a data field. The transmission side sends the management information inclusive of the compression type flag to the reception side. In the case where the reception side is incapable of decoding lossless-compression-resultant data, the reception side suspends data reception when the received compression type flag represents that the data compression is of the DVD-Audio lossless type. The transmission side sends authentication data to the reception side. The reception side generates an authentication response signal when receiving the authentication data. The reception side sends the authentication response signal to the transmission side. The transmission side decides whether or not the reception side is authorized to make a copy of the main data on the basis of the authentication response signal. When the reception side is authorized to make a copy of the main data, the transmission side starts the transmission of the main data.

The transmission side sends various flags and copy-related information to the reception side in addition to the main data. The various flags include an account flag, a zero flag, a mute flag, a pack flag (a pack type flag or a signal type flag), and a copy flag. The account flag depends on the type of contents information, and represents whether the contents information corresponds to "free" or "paid". The copy-related information includes a down sampling flag Fa, a down mix flag Fb, a dequantization flag Fc, and an information piece representing the number of times of copying (the copy generation number). The down mix flag Fb is set to "1" when a process of halving a sampling frequency Fs is implemented. The dequantization flag Fc is set to "1" when a process of dequantization from 20 bits to 16 bits is implemented. The number of times of copying which is represented by the piece of the copy-related information is either set to a given value or updated to a new value.

In the case where one or more of the serial interfaces 188-1, 188-2, 188-3, and 188-4 are not used, the transmission side sends zero flags of "1" to the reception side via the non-used serial interfaces. In the case where the main data continue to be "0", the transmission side sends a zero flag of "1" to the reception side. In the case of transmission of a still picture signal or a real time information signal via one of the serial interfaces 188-1, 188-2, 188-3, and 188-4, the transmission side sends a mute flag of "1" to the reception side via the present serial interface. In the case of transmission of an audio signal, a still picture signal, a real time information signal, or a video signal via one of the serial interfaces 188-1, 188-2, 188-3, and 188-4, the transmission side sends a signal type flag (a pack flag) representative of the type of the transmitted signal to the reception side via the present serial interface.

Figure 5:
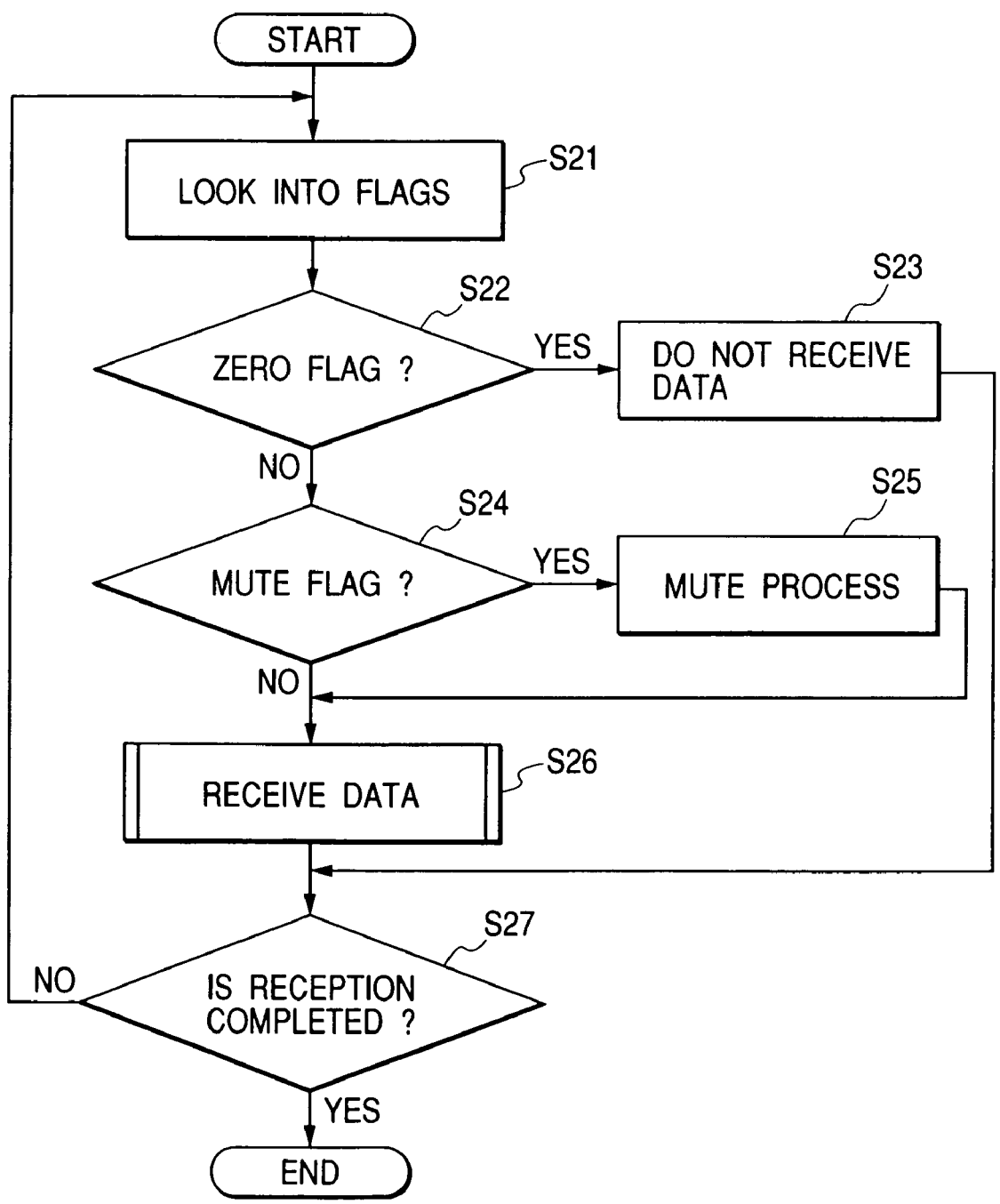
FIG. 5 is a flowchart a segment of a control program for a controller within a reception side in a third embodiment of this invention.

FIG. 5 is a flowchart of a segment of a control program for the controller within the reception side (the recording and reproducing device 200). With reference to FIG. 5, a first step S21 of the program segment detects received flags and received copy-related information. The step S21 looks into an account flag among the detected flags. When the account flag represents that contents information corresponds to "paid", the step S21 refers to a received copy-related information piece representative of the number of times of copying and determines a charge in response to the number of times of copying. Then, the step S21 executes account management including a process of electronically paying the charge from an electronic purse provided in the reception side.

A step S22 following the step S21 decides whether or not a zero flag of "1" is received. When a zero flag of "1" is received, the program advances from the step S22 to a step S23. Otherwise, the program advances from the step S22 to a step S24.

The step S23 prevents a main-data receiving process from being executed. After the step S23, the program advances to a step S27.

The step S24 decides whether or not a mute flag of "1" (or mute flags of "1") is received. When a mute flag of "1" is received, the program advances from the step S24 to a step S25. Otherwise, the program advances from the step S24 to a block S26.

The step S25 executes a muting process on a signal received via the serial interface related to the mute flag of "1". After the step S25, the program advances to the block S26.

The block S26 looks into a signal type flag (a pack flag) among the received flags, and executes the main-data receiving process in response to the signal type flag. After the block S26, the program advances to the step S27.

The step S27 decides whether or not the reception of the main data has been completed. When the reception of the main data has been completed, the program exits from the step S27 and then the current execution cycle of the program segment ends. When the reception of the main data has not been completed yet, the program returns from the step S27 to the step S21.

The reception side notifies the transmission side of the completion of the reception of the main data, that is, the completion of copying the main data. The transmission side updates or counts up the number of times of copying, which is represented by the piece of the copy-related information, in response to the notice from the reception side.

Figure 6:
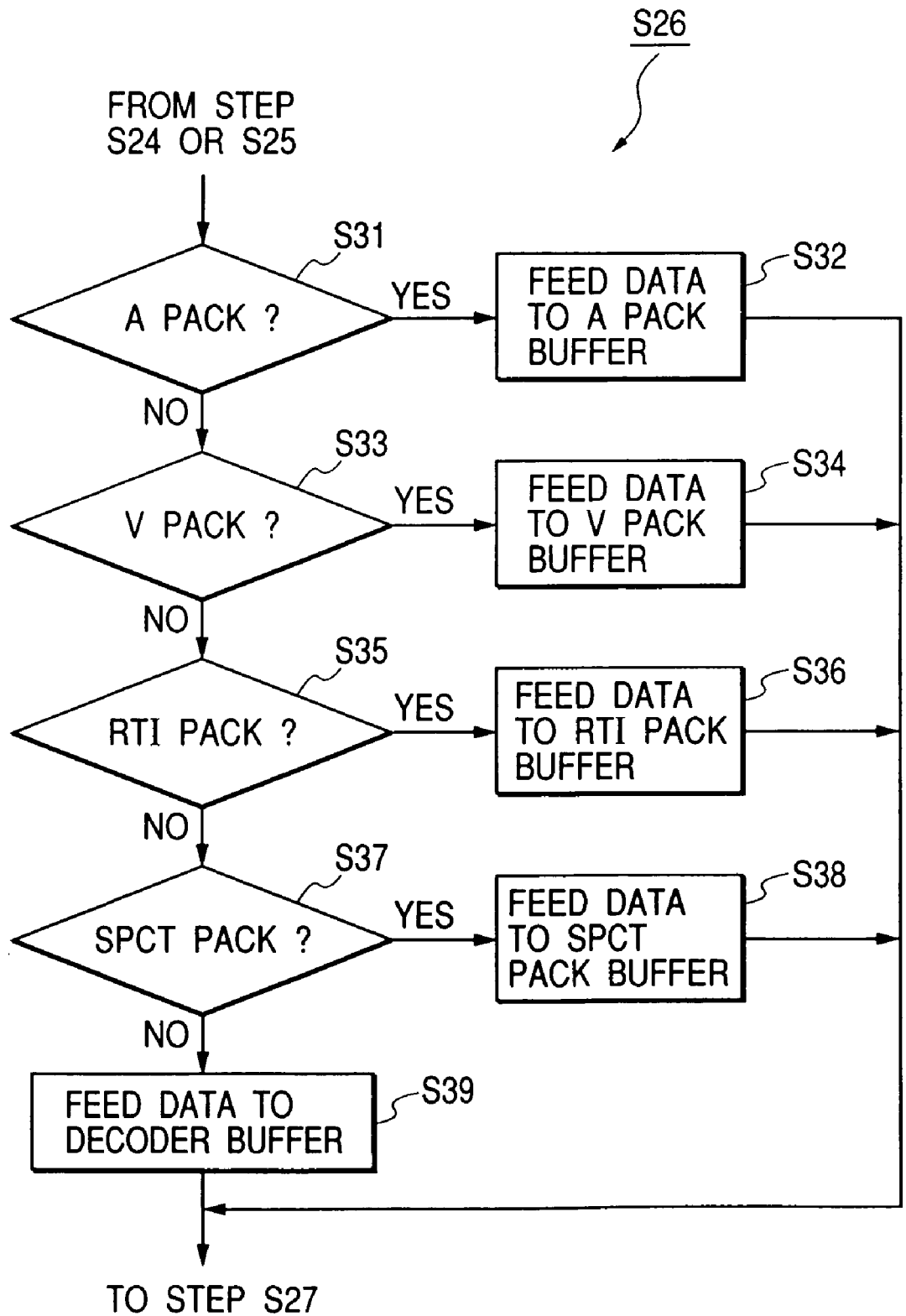
FIG. 6 is a flowchart of a block in FIG. 5.

FIG. 6 shows the details of the block S26 in FIG. 5. With reference to FIG. 6, a first step S31 in the block S26 decides whether or not the signal type flag corresponds to an audio signal (a DVD-Audio A pack, that is, a DVD-Audio audio pack). When the signal type flag corresponds to an audio signal, the program advances from the step S31 to a step S32. Otherwise, the program advances from the step S31 to a step S33.

The step S32 feeds a received signal (the received main data) to a buffer assigned to audio packs and provided in the reception side. After the step S32, the program jumps to the step S27 (see FIG. 5).

The step S33 decides whether or not the signal type flag corresponds to a video signal (a DVD-Audio V pack, that is, a DVD-Audio video pack). When the signal type flag corresponds to a video signal, the program advances from the step S33 to a step S34. Otherwise, the program advances from the step S33 to a step S35.

The step S34 feeds a received signal (the received main data) to a buffer assigned to video packs and provided in the reception side. After the step S34, the program jumps to the step S27 (see FIG. 5).

The step S35 decides whether or not the signal type flag corresponds to a real time information signal (a DVD-Audio RTI pack, that is, a DVD-Audio real time information pack). When the signal type flag corresponds to a real time information signal, the program advances from the step S35 to a step S36. Otherwise, the program advances from the step S35 to a step S37.

The step S36 feeds a received signal (the received main data) to a buffer assigned to real time information packs and provided in the reception side. After the step S36, the program jumps to the step S27 (see FIG. 5).

The step S37 decides whether or not the signal type flag corresponds to a still picture signal (a DVD-Audio SPCT pack, that is, a DVD-Audio still picture pack). When the signal type flag corresponds to a still picture signal, the program advances from the step S37 to a step S38. Otherwise, the program advances from the step S37 to a step S39.

The step S38 feeds a received signal (the received main data) to a buffer assigned to still picture packs and provided in the reception side. After the step S38, the program jumps to the step S27 (see FIG. 5).

The step S39 is executed when the signal type flag corresponds to other signals, for example, management data or management information. The step S39 feeds a received signal (the received main data) to a decoder buffer provided in the reception side. After the step S39, the program advances to the step S27 (see FIG. 5).

The above-mentioned management information and the above-mentioned flags are transmitted while being placed in data according to the MPEG protocol as will be described below.

An MPEG transport stream generated in the transmission side (the disc player 100 or 100A) includes a bit stream of audio-based data conforming to the DVD-Audio standards. The MPEG transport stream may include a bit stream of video data and audio data conforming to the DVD-Video standards or a bit stream of audio data conforming to the SACD (super audio CD) standards. Specifically, the MPEG transport stream has a sequence of 188-byte packets loaded with audio packs (A packs), video packs (V packs), real time information packs (RTI packs), and still picture packs (SPCT packs). The audio packs are of a linear PCM type and a packed PCM type (a compression PCM type).

Figure 7:
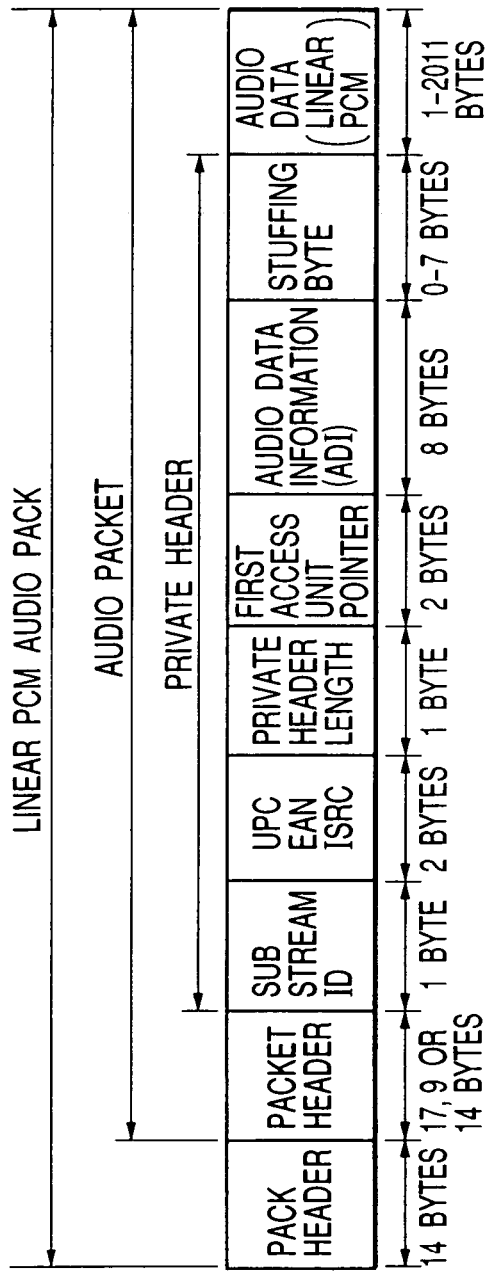
FIG. 7 is a diagram of a data structure of a linear PCM audio pack.

Linear PCM audio packs are recorded on a data area of a DVD-Audio. As shown in FIG. 7, one linear PCM audio pack has a length of 2,048 bytes or less, and is composed of a 14-byte pack header and an audio packet. The pack header is followed by the audio packet. The audio packet has a sequence of a packet header, a private header, and audio data (linear PCM audio data). The packet header has 9 bytes, 14 bytes, or 17 bytes. The audio data has 1 byte to 2,011 bytes.

The private header in the linear PCM audio pack has a sequence of 8-bit sub stream ID (identification) information, a 3-bit reserved area, 5-bit information of an UPC/EAN-ISRC (Universal Product Code/European Article Number-International Standard Recording Code) number, 8-bit information of UPC/EAN-ISRC data, 8-bit information of the private header length, a 16-bit first access unit pointer, 8-byte audio data information ADI, and 0 to 7 stuffing bytes.

The audio data information ADI in the linear PCM audio pack has a sequence of a 1-bit audio emphasis flag, a 1-bit reserved area, 1-bit information of a stereophonic playback mode, 1-bit information of down mix code effectiveness, a 4-bit down mix code, 4-bit information of the quantization word length (the quantization bit number) in a channel group "1", 4-bit information of the quantization word length (the quantization bit number) in a channel group "2", 4-bit information of the audio sampling frequency fs1 in the channel group "1", 4-bit information of the audio sampling frequency fs2 in the channel group "2", a 4-bit reserved area, 4-bit information of a multiple channel type, 3-bit information of a bit shift in the channel group "2", 5-bit channel assignment information, 8-bit dynamic-range control information, and a 16-bit reserved area. The channel assignment information is also referred to as the channel information.

Figure 8:
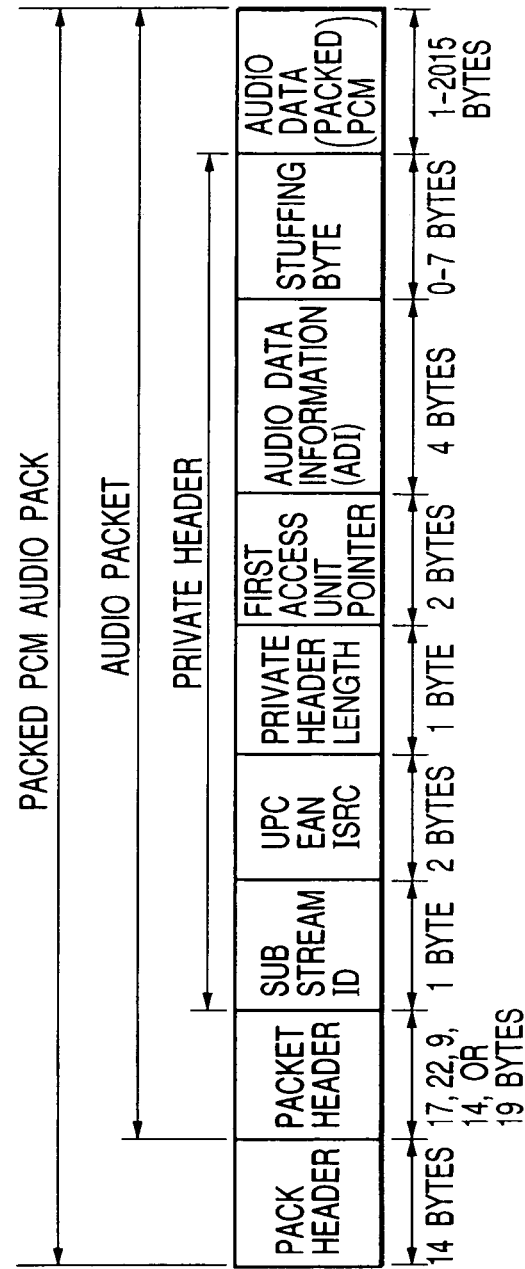
FIG. 8 is a diagram of a data structure of a packed PCM audio pack.

Packed PCM audio packs (compression PCM audio packs) are recorded on a data area of a DVD-Audio. As shown in FIG. 8, one packed PCM audio pack (one compression PCM pack) has a length of 2,048 bytes or less, and is composed of a 14-byte pack header and an audio packet. The pack header is followed by the audio packet. The audio packet has a sequence of a packet header, a private header, and audio data (packed PCM audio data). The packed PCM audio data result from a lossless compression process. The packet header has 9 bytes, 14 bytes, 17 bytes, 19 bytes, or 22 bytes. The audio data has 1 byte to 2,015 bytes.

The private header in the packed PCM audio pack has a sequence of 8-bit sub stream ID (identification) information, a 3-bit reserved area, 5-bit information of an UPC/EAN-ISRC (Universal Product Code/European Article Number-International Standard Recording Code) number, 8-bit information of UPC/EAN-ISRC data, 8-bit information of the private header length, a 16-bit first access unit pointer, 4-byte audio data information ADI, and 0 to 7 stuffing bytes.

The audio data information ADI in the packed PCM audio pack contains an 8-bit forward search pointer, an 8-bit backward search pointer, and a 16-bit reserved area.

Figure 9:
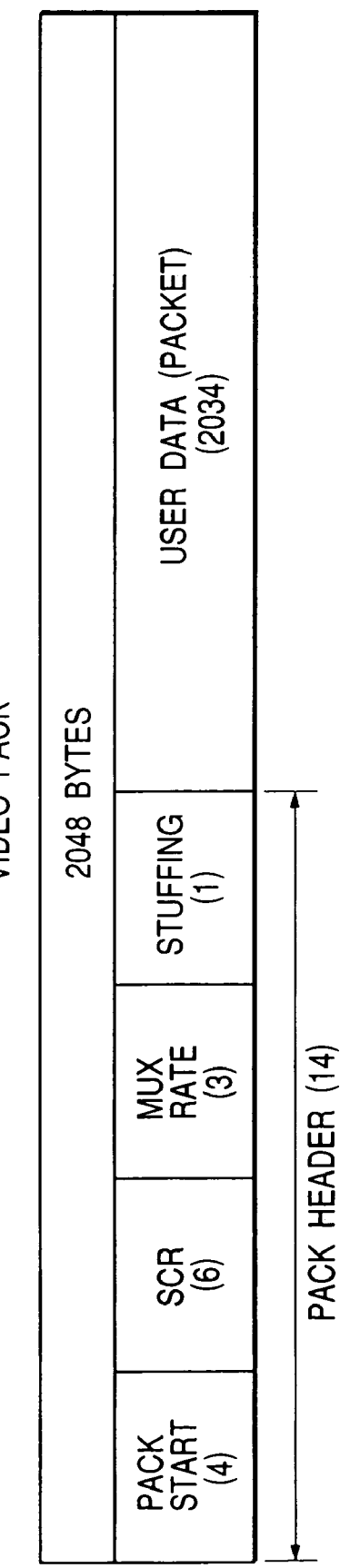
FIG. 9 is a diagram of a data structure of a video pack.

Video packs are recorded on a data area of a DVD-Audio or a DVD-Video. As shown in FIG. 9, one video pack has a length of 2,048 bytes or less, and is composed of a 14-byte pack header and a user data packet. The pack header is followed by the user data packet. The pack header has a sequence of 4-byte pack start information, 6-byte SCR (system clock reference) information, 3-byte MUX (multiplexed) rate information, and 1-byte stuffing data. The user data packet is loaded with 2,034-byte user data.

Figure 10:
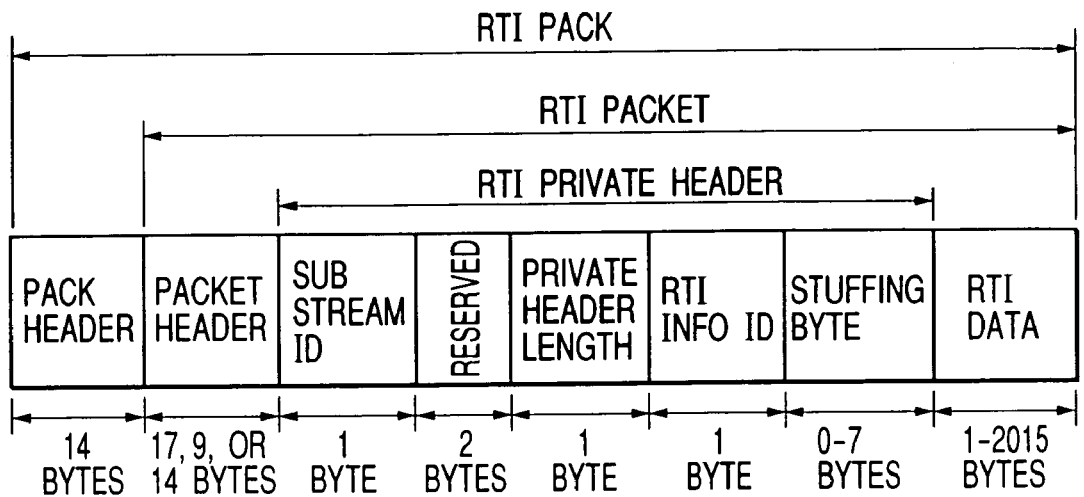
FIG. 10 is a diagram of a data structure of a real time information pack.

Real time information packs are recorded on a data area of a DVD-Audio. As shown in FIG. 10, one real time information pack has a length of 2,048 bytes or less, and is composed of a 14-byte pack header and a real time information packet. The pack header is followed by the real time information packet. The real time information packet has a sequence of a packet header, a private header, and real time information data. The packet header has 9 bytes, 14 bytes, or 17 bytes. The real time information data has 1 byte to 2,015 bytes.

The private header of the real time information packet has a sequence of 1-byte sub stream ID (identification) information, a 2-byte reserved area, 1-byte information of the private header length, 1-byte real time information identification (ID) data, and 0 to 7 stuffing bytes. The real time information ID data are divided into a 4-bit reserved area and a 4-bit effective data area.

Figure 11:
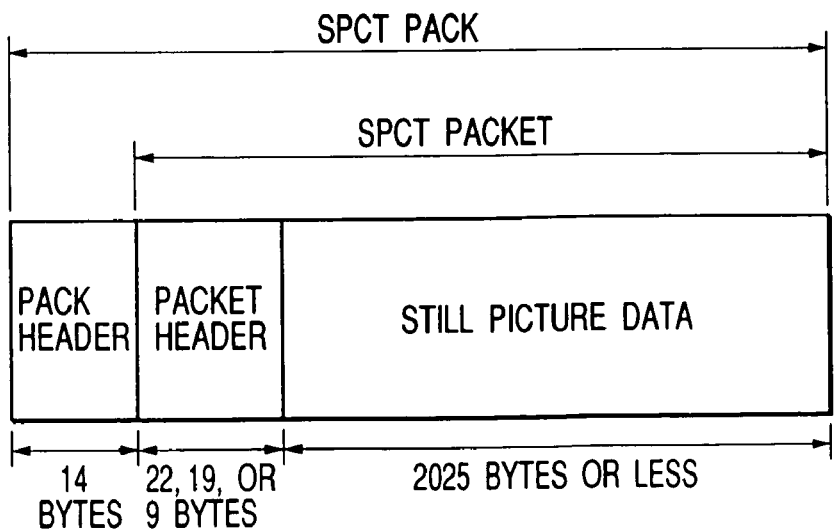
FIG. 11 is a diagram of a data structure of a still picture pack.

Still picture packs are recorded on a data area of a DVD-Audio. As shown in FIG. 11, one still picture pack has a length of 2,048 bytes or less, and is composed of a 14-byte pack header and a still picture packet. The pack header is followed by the still picture packet. The still picture packet has a sequence of a packet header and still picture data. The packet header has 9 bytes, 19 bytes, or 22 bytes. The still picture data has 1 byte to 2,025 bytes.

For example, each of the serial interfaces 188-1, 188-2, 188-3, and 188-4 (see FIGS. 1 and 3) has the function of generating isochronous packets from data outputted by the data transmission interface 200a or 200aa (see FIGS. 1 and 3). Each of the serial interfaces 188-1, 188-2, 188-3, and 188-4 transmits the generated isochronous packets. Operation of the serial interfaces 188-1, 188-2, 188-3, and 188-4 will be described in more detail below.

With reference to FIG. 12, an MPEG transport stream generated in the transmission side (the disc player 100 or 100A) has a sequence of 188-byte packets. Time stamps referred to as source packet headers and each having 4 bytes are added to the front ends of 188-byte packets to form 192-byte signal segments respectively. In the reception side, voices and moving pictures are sequentially played back in accordance with the time stamps.

Each 192-byte signal segment is divided into four 48-byte data blocks. One 192-byte signal segment may be used as one 192-byte data block. One 192-byte signal segment may be divided into two 96-byte data blocks. One 192-byte signal segment may be divided into eight 24-byte data blocks.

The data blocks are arranged into groups each having two or more successive data blocks. In each group, data blocks are connected or combined. Packet headers for IEEE1394 are added to the front ends of the groups to form isochronous packets respectively. A time interval of 125 µs is defined as a 1-cycle period. At most one isochronous packet is placed in a 1-cycle period.

With reference to FIG. 13, arbitration is added to the head of each of cycle start packets and isochronous packets. During transmission, arbitration-added cycle start packets are placed in 1-cycle periods respectively. Normally, in a 1-cycle period, an arbitration-added cycle start packet is followed by an arbitration-added isochronous packet or a plurality of arbitration-added isochronous packets. An arbitration-added isochronous packet may be absent from a 1-cycle period.

One isochronous packet has a sequence of a packet header, a data field, and a 32-bit data error detection code. The packet header has a sequence of 16-bit data length information, a 2-bit tag, 6-bit packet transmission channel assignment information, a 4-bit transaction code, a 4-bit sync code, and a 32-bit packet header error detection code. The tag represents whether a CIP (common isochronous packet) header is present or absent. The transaction code indicates a processing code.

The data field in the isochronous packet has a sequence of a 32-bit CIP header, a 32-bit real data header, real data, and a 32-bit real data tail. The real data header contains 8-bit ID (identification) information, 16-bit application information, and 8-bit copy-related information. The ID information in the real data header has a 4-bit piece representing the total number of serial interfaces (the serial interfaces 188-1, 188-2, 188-3, and 188-4), and a 4-bit piece of the ID number of the serial interface via which the present isochronous packet is transmitted. The application information in the real data header has a 4-bit pack flag (a 4-bit signal type flag), a 1-bit zero flag, a 1-bit mute flag, an 8-bit account flag, and a 2-bit copy flag. The pack flag represents the type of a related pack. Specifically, the pack flag represents which of an audio pack, a video pack, a real time information pack, and a still picture pack the related pack is equal to. The copy-related information in the real data header has a 1-bit down sampling flag Fa, a 1-bit down mix flag Fb, a 1-bit dequantization flag Fc, and a 5-bit piece representing the number of times of copying (the copy generation number).

The real data tail in the data field contains 8-bit ID information and 16-bit management information. The real data tail also has an 8-bit reserved area. As shown in FIG. 14, the management information is composed of unit segments given addresses "00" to "FF" in hexadecimal notation respectively. The addresses "00" to "FF" are placed in the ID information in the real data tail. The management information has ISRC information in an address range from "00" to "07", an UPC/EAN/JAN code in an address range from "08" to "0B", SDCM information (copy management information) in an address "0C", encryption-related information in an address range from "0D" to "2F", allowed-use-term information (account information) in an address range from "30" to "3F", contents ID information in an address "40", copyright-protection-term information in an address range from "41" to "46", player-related information in an address range from "47" to "4A", text data in address range from "4B" to "72", user ID information in an address range from "73" to "7F", a compression type flag (a DVD-Audio lossless compression flag or a DVD-Audio packed PCM flag) in an address "80", an reserved area in an address range from "81" to "BF", disc management data in an address range from "C0" to "C7", master tape management data in an address range from "C8" to "CE", and software production basic information in an address range from "CF" to "FF".

Figures 15, 16:
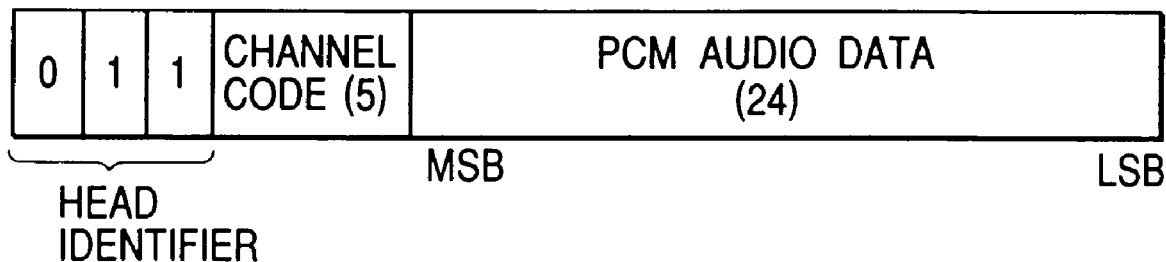
FIG. 15 is a diagram of a format of 32-bit multiple-channel audio data in real data in FIG. 13.
FIG. 16 is a diagram of the channel assignment of words of a channel code in FIG. 15.

Multiple-channel audio data being AM824 data are placed in the real data within the data field. The multiple-channel audio data are in a 32-bit format shown in FIG. 15. With reference to FIG. 15, the multiple-channel audio data are composed of 32 bits, and have a sequence of a 3-bit head identifier "011", a 5-bit channel code, and 24-bit PCM audio data. The 24-bit PCM audio data have 24-bit, 20-bit, or 16-bit effective data. In the case of 20-bit or 16-bit effective data, remaining bits starting from an LSB side are filled with "0".

As shown in FIG. 16, the channel code in the 32-bit multiple-channel audio data has words "0" to "1F" in hexadecimal notation. The code word "0" is assigned to a left front channel Lf. The code word "1" is assigned to a right front channel Rf. The code word "2" is assigned to a surround channel S. The code word "3" is assigned to a left surround channel Ls. The code word "4" is assigned to a right surround channel Rs. The code word "5" is assigned to a center channel C. The code word "6" is assigned to a low frequency effect channel. LFE. The code words "7 to "1F" are reserved.

FIG. 17 shows an example of the real data which have a set of 32-bit segments each corresponding to 32-bit multiple-channel audio data (see FIG. 15).

Fourth Embodiment

A fourth embodiment of this invention is similar to the third embodiment thereof except for design changes indicated hereinafter. According to the fourth embodiment of this invention, 16-bit information is placed in ID information and a reserved area of a real data tail (see FIG. 13). The 16-bit information substitutes for the channel code in the 32-bit multiple-channel audio data (see. FIGS. 15 and 16).

As shown in FIG. 18, the 16-bit information has a sequence of 4-bit information of the audio sampling frequency fs in the related channel group, 4-bit information of a multiple channel type (the sampling frequency and the bit number), 5-bit channel assignment information, and 3-bit data. The 3-bit data have a reserved bit, a down mix flag, and a dequantization flag. The channel assignment information is also referred to as the channel information.

The channel assignment represented by the 5-bit sequence in the channel assignment information can be changed among 21 different types shown in FIG. 19. A bit sequence of "00000" is allocated to a first type of the channel assignment in which a first channel ACH0 forms a monaural channel C(mono), and second and later channels ACH1, ACH2, ACH3, ACH4, and ACH5 are unused. According to the first type of the channel assignment, the monaural channel C(mono) is in the group "1". Thus, the channel number in the group "1" is equal to one while the channel number in the group "2" is equal to zero. A bit sequence of "00001" is allocated to a second type of the channel assignment in which the first and second channels ACH0 and ACH1 form a left channel L and a right channel R respectively, and the third and later channels ACH2, ACH3, ACH4, and ACH5 are unused. According to the second type of the channel assignment, the left channel L and the right channel R are in the group "1". Thus, the channel number in the group "1" is equal to two while the channel number in the group "2" is equal to zero. A bit sequence of "00010" is allocated to a third type of the channel assignment in which the first, second, and third channels ACH0, ACH1, and ACH2 form a left front channel Lf, a right front channel Rf, and a surround channel S respectively, and the fourth and later channels ACH3, ACH4, and ACH5 are unused. According to the third type of the bit assignment, the left front channel Lf and the right front channel Rf are in the group "1" while the surround channel S is in the group "2". Thus, the channel number in the group "1" is equal to two while the channel number in the group "2" is equal to one. A bit sequence of "00011" is allocated to a fourth type of the channel assignment in which the first, second, third, and fourth channels ACH0, ACH1, ACH2, and ACH3 form a left front channel Lf, a right front channel Rf, a left surround channel Ls, and a right surround channel Rs respectively, and the fifth and sixth channels ACH4 and ACH5 are unused. According to the fourth type of the channel assignment, the left front channel Lf and the right front channel Rf are in the group "1" while the left surround channel Ls and the right surround channel Rs are in the group "2". Thus, the channel number in the group "1" is equal to two while the channel number in the group "2" is also equal to two. A bit sequence of "00100" is allocated to a fifth type of the channel assignment in which the first, second, and third channels ACH0, ACH1, and ACH2 form a left front channel Lf, a right front channel Rf, and a low frequency effect channel LFE respectively, and the fourth and later channels ACH3, ACH4, and ACH5 are unused. According to the fifth type of the channel assignment, the left front channel Lf and the right front channel Rf are in the group "1" while the low frequency effect channel LFE is in the group "2". Thus, the channel number in the group "1" is equal to two while the channel number in the group "2" is equal to one. A bit sequence of "00101" is allocated to a sixth type of the channel assignment in which the first, second, third, and fourth channels ACH0, ACH1, ACH2, and ACH3 form a left front channel Lf, a right front channel Rf, a low frequency effect channel LFE, and a surround channel S respectively, and the fifth and sixth channels ACH4 and ACH5 are unused. According to the sixth type of the channel assignment, the left front channel Lf and the right front channel Rf are in the group "1" while the low frequency effect channel LFE and the surround channel S are in the group "2". Thus, the channel number in the group "1" is equal to two while the channel number in the group "2" is also equal to two. A bit sequence of "00110" is allocated to a seventh type of the channel assignment in which the first, second, third, fourth, and fifth channels ACH0, ACH1, ACH2, ACH3, and ACH4 form a left front channel Lf, a right front channel Rf, a low frequency effect channel LFE, a left surround channel Ls, and a right surround channel Rs respectively, and the sixth channel ACH5 is unused. According to the seventh type of the channel assignment, the left front channel Lf and the right front channel Rf are in the group "1" while the low frequency effect channel LFE, the left surround channel Ls, and the right surround channel Rs are in the group "2". Thus, the channel number in the group "1" is equal to two while the channel number in the group "2" is equal to three. A bit sequence of "00111" is allocated to an eighth type of the channel assignment in which the first, second, and third channels ACH0, ACH1, and ACH2 form a left front channel Lf, a right front channel Rf, and a center channel C respectively, and the fourth and later channels ACH3, ACH4, and ACH5 are unused. According to the eighth type of the channel assignment, the left front channel Lf and the right front channel Rf are in the group "1" while the center channel C is in the group "2". Thus, the channel number in the group "1" is equal to two while the channel number in the group "2" is equal to one. A bit sequence of "01000" is allocated to a ninth type of the channel assignment in which the first, second, third, and fourth channels ACH0, ACH1, ACH2, and ACH3 form a left front channel Lf, a right front channel Rf, a center channel C, and a surround channel S respectively, and the fifth and sixth channels ACH4 and ACH5 are unused. According to the ninth type of the channel assignment, the left front channel Lf and the right front channel Rf are in the group "1" while the center channel C and the surround channel S are in the group "2". Thus, the channel number in the group "1" is equal to two while the channel number in the group "2" is also equal to two. A bit sequence of "01001" is allocated to a tenth type of the channel assignment in which the first, second, third, fourth, and fifth channels ACH0, ACH1, ACH2, ACH3, and ACH4 form a left front channel Lf, a right front channel Rf, a center channel C, a left surround channel Ls, and a right surround channel Rs respectively, and the sixth channel ACH5 is unused. According to the tenth type of the channel assignment, the left front channel Lf and the right front channel Rf are in the group "1" while the center channel C, the left surround channel Ls, and the right surround channel Rs are in the group "2". Thus, the channel number in the group "1" is equal to two while the channel number in the group "2" is equal to three. A bit sequence of "01010" is allocated to an eleventh type of the channel assignment in which the first, second, third, and fourth channels ACH0, ACH1, ACH2, and ACH3 form a left front channel Lf, a right front channel Rf, a center channel C, and a low frequency effect channel LFE respectively, and the fifth and sixth channels ACH4 and ACH5 are unused. According to the eleventh type of the channel assignment, the left front channel Lf and the right front channel Rf are in the group "1" while the center channel C and the low frequency effect channel LFE are in the group "2". Thus, the channel number in the group "1" is equal to two while the channel number in the group "2" is also equal to two. A bit sequence of "01011" is allocated to a twelfth type of the channel assignment in which the first, second, third, fourth, and fifth channels ACH0, ACH1, ACH2, ACH3, and ACH4 form a left front channel Lf, a right front channel Rf, a center channel C, a low frequency effect channel LFE, and a surround channel S respectively, and the sixth channel ACH5 is unused. According to the twelfth type of the channel assignment, the left front channel Lf and the right front channel Rf are in the group "1" while the center channel C, the low frequency effect channel LFE, and the surround channel S are in the group "2". Thus, the channel number in the group "1" is equal to two while the channel number in the group "2" is equal to three. A bit sequence of "01100" is allocated to a thirteenth type of the channel assignment in which the first, second, third, fourth, fifth, and sixth channels ACH0, ACH1, ACH2, ACH3, ACH4, and ACH5 form a left front channel Lf, a right front channel Rf, a center channel C, a low frequency effect channel LFE, a left surround signal Ls, and a right surround channel Rs respectively. According to the thirteenth type of the channel assignment, the left front channel Lf and the right front channel Rf are in the group "1" while the center channel C, the low frequency effect channel LFE, the left surround signal Ls, and the right surround channel Rs are in the group "2". Thus, the channel number in the group "1" is equal to two while the channel number in the group "2" is equal to four. A bit sequence of "01101" is allocated to a fourteenth type of the channel assignment in which the first, second, third, and fourth channels ACH0, ACH1, ACH2, and ACH3 form a left front channel Lf, a right front channel Rf, a center channel C, and a surround channel S respectively, and the fifth and sixth channels ACH4 and ACH5 are unused. According to the fourteenth type of the channel assignment, the left front channel Lf, the right front channel Rf, and the center channel C are in the group "1" while the surround channel S is in the group "2". Thus, the channel number in the group "1" is equal to three while the channel number in the group "2" is equal to one. A bit sequence of "01110" is allocated to a fifteenth type of the channel assignment in which the first, second, third, fourth, and fifth channels ACH0, ACH1, ACH2, ACH3, and ACH4 form a left front channel Lf, a right front channel Rf, a center channel C, a left surround channel Ls, and a right surround channel Rs respectively, and the sixth channel ACH5 is unused. According to the fifteenth type of the channel assignment, the left front channel Lf, the right front channel Rf, and the center channel C are in the group "1" while the left surround channel Ls and the right surround channel Rs are in the group "2". Thus, the channel number in the group "1" is equal to three while the channel number in the group "2" is equal to two. A bit sequence of "01111" is allocated to a sixteenth type of the channel assignment in which the first, second, third, and fourth channels ACH0, ACH1, ACH2, and ACH3 form a left front channel Lf, a right front channel Rf, a center channel C, and a low frequency effect channel LFE respectively, and the fifth and sixth channels ACH4 and ACH5 are unused. According to the sixteenth type of the channel assignment, the left front channel Lf, the right front channel Rf, and the center channel C are in the group "1" while the low frequency effect channel LFE is in the group "2". Thus, the channel number in the group "1" is equal to three while the channel number in the group "2" is equal to one. A bit sequence of "10000" is allocated to a seventeenth type of the channel assignment in which the first, second, third, fourth, and fifth channels ACH0, ACH1, ACH2, ACH3, and ACH4 form a left front channel Lf, a right front channel Rf, a center channel C, a low frequency effect channel LFE, and a surround channel S respectively, and the sixth channel ACH5 is unused. According to the seventeenth type of the channel assignment, the left front channel Lf, the right front channel Rf, and the center channel C are in the group "1" while the low frequency effect channel LFE and the surround channel S are in the group "2". Thus, the channel number in the group "1" is equal to three while the channel number in the group "2" is equal to two. A bit sequence of "10001" is allocated to an eighteenth type of the channel assignment in which the first, second, third, fourth, fifth, and sixth channels ACH0, ACH1, ACH2, ACH3, ACH4, and ACH5 form a left front channel Lf, a right front channel Rf, a center channel C, a low frequency effect channel LFE, a left surround signal Ls, and a right surround channel Rs respectively. According to the eighteenth type of the channel assignment, the left front channel Lf, the right front channel Rf, and the center channel C are in the group "1" while the low frequency effect channel LFE, the left surround signal Ls, and the right surround channel Rs are in the group "2". Thus, the channel number in the group "1" is equal to three while the channel number in the group "2" is also equal to three. A bit sequence of "10010" is allocated to a nineteenth type of the channel assignment in which the first, second, third, fourth, and fifth channels ACH0, ACH1, ACH2, ACH3, and ACH4 form a left front channel Lf, a right front channel Rf, a left surround channel Ls, a right surround channel Rs, and a low frequency effect channel LFE respectively, and the sixth channel ACH5 is unused. According to the nineteenth type of the channel assignment, the left front channel Lf, the right front channel Rf, the left surround channel Ls, and the right surround channel Rs are in the group "1" while the low frequency effect channel LFE is in the group "2". Thus, the channel number in the group "1" is equal to four while the channel number in the group "2" is equal to one. A bit sequence of "10011" is allocated to a twentieth type of the channel assignment in which the first, second, third, fourth, and fifth channels ACH0, ACH1, ACH2, ACH3, and ACH4 form a left front channel Lf, a right front channel Rf, a left surround channel Ls, a right surround channel Rs, and a center channel C respectively, and the sixth channel ACH5 is unused. According to the twentieth type of the channel assignment, the left front channel Lf, the right front channel Rf, the left surround channel Ls, and the right surround channel Rs are in the group "1" while the center channel C is in the group "2". Thus, the channel number in the group "1" is equal to four while the channel number in the group "2" is equal to one. A bit sequence of "10100" is allocated to a twenty-first type of the channel assignment in which the first, second, third, fourth, fifth, and sixth channels ACH0, ACH1, ACH2, ACH3, ACH4, and ACH5 form a left front channel Lf, a right front channel Rf, a left surround channel Ls, a right surround channel Rs, a center channel C, and a low frequency effect channel LFE respectively. According to the twenty-first type of the channel assignment, the left front channel Lf, the right front channel Rf, the left surround channel Ls, and the right surround channel Rs are in the group "1" while the center channel C and the low frequency effect channel C are in the group "2". Thus, the channel number in the group "1" is equal to four while the channel number in the group "2" is equal to two.

Figure 20:
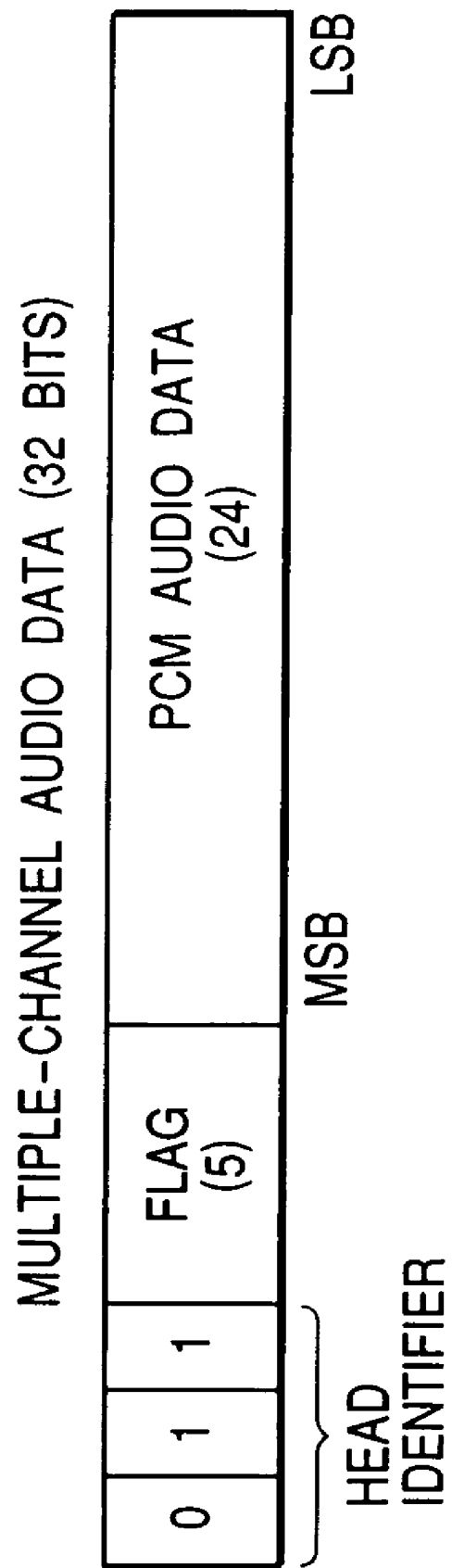
FIG. 20 is a diagram of a format of 32-bit multiple-channel audio data which is used instead of the 32-bit multiple-channel audio data format in FIG. 15.

The fourth embodiment of this invention uses a 32-bit multiple-channel audio data format in FIG. 20 instead of the 32-bit multiple-channel audio data format in FIG. 15. With reference to FIG. 20, 32-bit multiple-channel audio data have a sequence of a 3-bit head identifier "011", a 5-bit flag, and 24-bit PCM audio data. The 24-bit PCM audio data have 24-bit, 20-bit, or 16-bit effective data. In the case of 20-bit or 16-bit effective data, remaining bits starting from an LSB side are filled with "0". The 5-bit flag is designed as follows. The two higher bits of the 5-bit flag represent the bit number of effective data in the 24-bit PCM audio data. Specifically, the two higher bits being "00" indicate that the effective data in the 24-bit PCM audio data have 24 bits. The two higher bits being "01" indicate that the effective data in the 24-bit PCM audio data have 20 bits. The two higher bits being "10" indicate that the effective data in the 24-bit PCM audio data have 16 bits. The three lower bits of the 5-bit flag represent down sampling information. Specifically, the three lower bits being "010" indicate the absence of down sampling. Here, "down sampling" means, for example, change to a ½ sampling frequency, that is, halving a sampling frequency. The three lower bits being "011" indicate the presence of down sampling. The channel corresponding to the 32-bit multiple-channel audio data is decided by the channel assignment information in FIG. 18 and the order of the channels ACH0, ACH1, ACH2, ACH3, ACH4, and ACH5 in FIG. 19.

Fifth Embodiment

Figure 21:
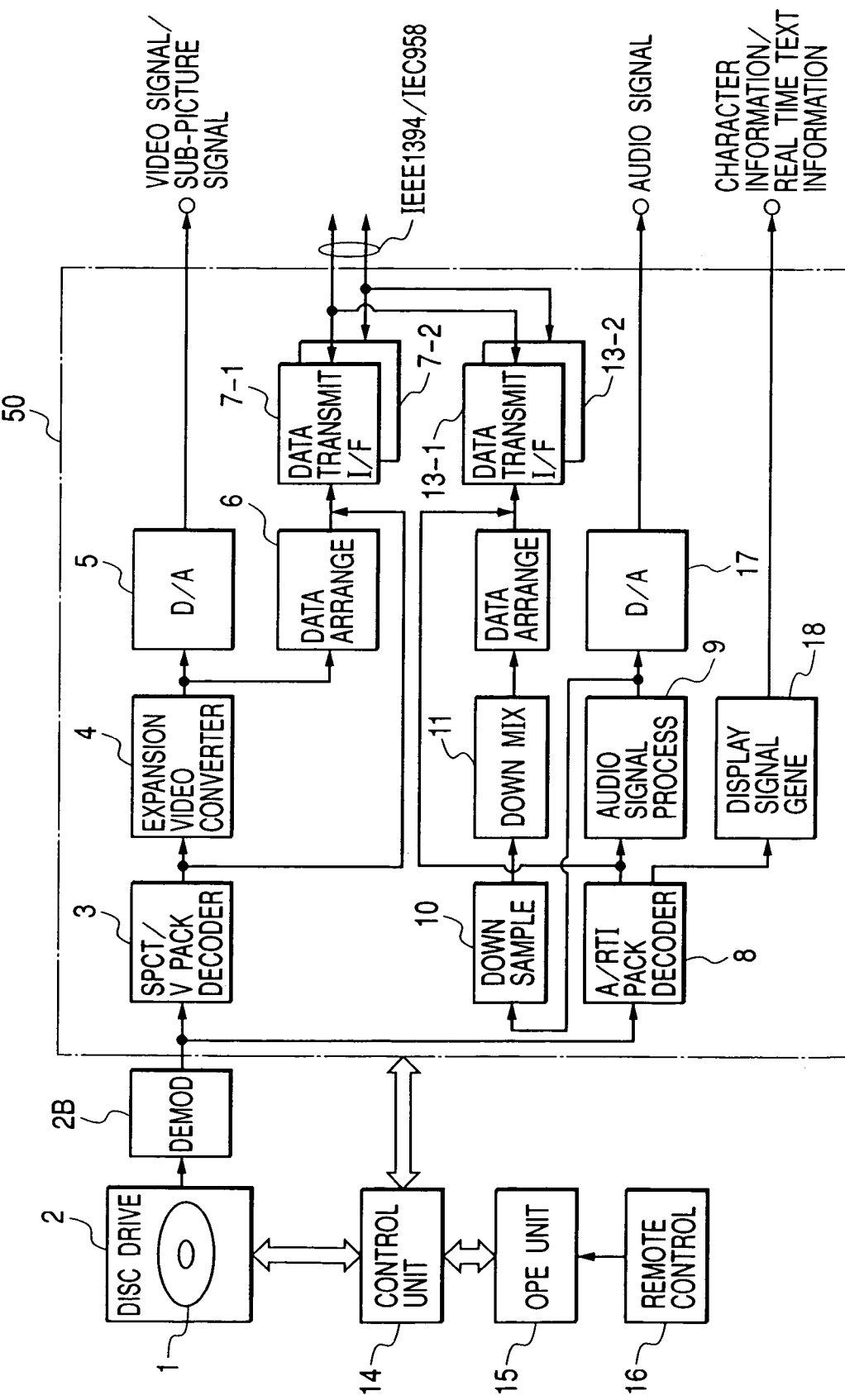
FIG. 21 is a block diagram of a disc player according to a fifth embodiment of this invention.

FIG. 21 shows a disc player according to a fifth embodiment of this invention. The disc player in FIG. 21 can be used as the disc player 100 or 100A in one of the first, second, third, and fourth embodiments of this invention. The disc player in FIG. 21 is of a universal type, being able to play back any one of different-type DVD's including a DVD-Audio and a DVD-Video.

The disc player in FIG. 21 operates on a DVD family disc (for example, a DVD-Audio, a DVD-Video, or a DVD-RAM) 1. As shown in FIG. 21, the disc player includes a control unit 14, an operation unit 15, and a remote control unit 16. The remote control unit 16 can communicate with the operation unit 15 by wireless. The operation unit 15 is connected to the control unit 14. The control unit 14 includes a CPU. The control unit 14 is connected to a disc drive unit 2 and a reproduced signal processing unit 50. The disc drive unit 2 is connected to the reproduced signal processing unit 50 via a demodulation circuit 2B.

The CPU 14 operates in accordance with a control program stored in its internal ROM. When the user actuates the operation unit 15 or the remote control unit 16 to request tune selection, playback, fast feed, or stop, the CPU 14 controls the disc drive unit 2 and the reproduced signal processing unit 50 to implement the requested operation mode.

During playback, the disc drive unit 2 reads out a signal from the DVD family disc 1. The disc drive unit 2 outputs the read-out signal to the demodulation circuit 2B. The demodulation circuit 2B subjects the output signal of the disc drive unit 2 to given demodulation (for example, EFM demodulation). The demodulation circuit 2B outputs the demodulation-resultant signal to the reproduced signal processing unit 50 as a reproduced signal. The demodulation circuit 2B may be incorporated in the disc drive unit 2.

The reproduced signal processing circuit 50 includes a video and still-picture pack decoder 3 receiving the reproduced signal from the demodulation circuit 2B. The video and still-picture pack decoder 3 includes a detector for detecting video packs and still picture packs in the reproduced signal. The video and still-picture pack decoder 3 decodes the video packs and the still picture packs into a video data stream (a DVD video stream). The video and still-picture pack decoder 3 outputs the video data stream to an expansion video converter 4 and data transmission interfaces 7-1 and 7-2 in the reproduced signal processing circuit 50. The data transmission interfaces 7-1 and 7-2 correspond to the data transmission interface 200a in FIG. 1 or the data transmission interface 200aa in FIG. 3.

The expansion video converter 4 subjects the video data stream to an expansion process and a descrambling process, thereby converting the video data stream into a digital video signal. The expansion video converter 4 outputs the digital video signal to a D/A converter 5 in the reproduced signal processing circuit 50. The D/A converter 5 changes the digital video signal into a corresponding analog video signal. The D/A converter 5 outputs the analog video signal. The analog video signal can be an analog sub picture signal originating from the video packs. The analog video signal can be transmitted from the D/A converter 5 to an external display. In this case, pictures represented by the analog video signal are indicated by the external display.

The expansion video converter 4 outputs the digital video signal also to a data arranger 6 in the reproduced signal processing circuit 50. The data arranger 6 subjects the digital video signal to a packing-based data arranging process, thereby converting the digital video signal into an arrangement-resultant signal. The data arranger 6 outputs the arrangement-resultant digital video signal to the data transmission interfaces 7-1 and 7-2.

During a first video transmission mode of operation of the disc player, the arrangement-resultant digital video signal is sent from the data arranger 6 to a recording and reproducing device 200 (see FIG. 1 or 3) via the data transmission interfaces 7-1 and 7-2 and IEEE1394 serial interfaces. The IEEE1394 serial interfaces correspond to the IEEE1394 serial interfaces 188-1, 188-2, 188-3, and 188-4 in FIG. 1 or 3. The IEEE 1394 serial interfaces may be replaced by IEC958 serial interfaces.

During a second video transmission mode of operation of the disc player, the video data stream is sent from the video and still-picture pack decoder 3 to the recording and reproducing device 200 via the data transmission interfaces 7-1 and 7-2 and the IEEE1394 serial interfaces (or the IEC958 serial interfaces).

The reproduced signal processing circuit 50 includes an audio and real-time-information pack decoder 8 receiving the reproduced signal from the demodulation circuit 2B. The audio and real-time-information pack decoder 8 includes a detector for detecting audio packs and real time information packs in the reproduced signal. The audio and real-time-information pack decoder 8 decodes the audio packs into an audio data stream (a DVD audio stream). The audio and real-time-information pack decoder 8 outputs the audio data stream to an audio signal processor 9 and data transmission interfaces 13-1 and 13-2 in the reproduced signal processing circuit 50. The data transmission interfaces 13-1 and 13-2 correspond to the data transmission interface 200a in FIG. 1 or the data transmission interface 200aa in FIG. 3.

The audio signal processor 9 subjects the audio data stream to a PCM conversion process and a descrambling process, thereby converting the audio data stream into a PCM audio signal. The audio signal processor 9 may also subjects the audio data stream to a dequantization process. The audio signal processor 9 outputs the PCM audio signal to a down sampler 10 and a D/A converter 17 in the reproduced signal processing circuit 50. The D/A converter 17 changes the PCM audio signal into a corresponding analog audio signal. The analog audio signal can be transmitted from the D/A converter 17 to an external loudspeaker. In this case, the analog audio signal is converted into corresponding sounds by the external loudspeaker.

The audio and real-time-information pack decoder 8 extracts real time information (for example, character information or real time text information) from the real time information packs. The audio and real-time-information pack decoder 8 outputs the real time information to a display signal generator 18 in the reproduced signal processing circuit 50. The display signal generator 18 converts the real time information into a corresponding display signal. The display signal can be transmitted from the display signal generator 18 to the external display. In this case, the external display indicates the display signal. The display signal contains, for example, the character information or the real time text information.

The down sampler 10 subjects the PCM audio signal to a down sampling process, thereby converting the PCM audio signal into a down-sampling-resultant digital audio signal. The down sampler 10 outputs the down-sampling-resultant digital audio signal to a down mixer 11 in the reproduced signal processing circuit 50. In the case where the output signal of the down sampler 10 is a multiple-channel signal, the device 11 down-mixes the output signal of the down sampler 10 into a stereophonic 2-channel digital audio signal. The down mixer 11 outputs the stereophonic 2-channel digital audio signal to a data arranger 12 in the reproduced signal processing circuit 50. In the case where the output signal of the down sampler 10 is a monaural signal or a 2-channel signal, the down mixer 11 passes the signal from the down sampler 10 to the data arranger 12 without processing the signal. The data arranger 12 subjects the output signal of the down mixer 11 to a data arranging process, thereby converting the output signal of the down mixer 11 into an arrangement-resultant digital audio signal. The data arranger 12 outputs the arrangement-resultant digital audio signal to the data transmission interfaces 13-1 and 13-2.

During a first audio transmission mode of operation of the disc player, the arrangement-resultant digital audio signal is sent from the data arranger 12 to the recording and reproducing device 200 (see FIG. 1 or 3) via the data transmission interfaces 13-1 and 13-2 and IEEE1394 serial interfaces. The IEEE1394 serial interfaces correspond to the IEEE1394 serial interfaces 188-1, 188-2, 188-3, and 188-4 in FIG. 1 or 3. The IEEE1394 serial interfaces may be replaced by IEC958 serial interfaces.

During a second audio transmission mode of operation of the disc player, the audio data stream is sent from the audio and real-time-information pack decoder 8 to the recording and reproducing device 200 via the data transmission interfaces 13-1 and 13-2 and the IEEE1394 serial interfaces (or the IEC958 serial interfaces).

Sixth Embodiment

Figure 22:
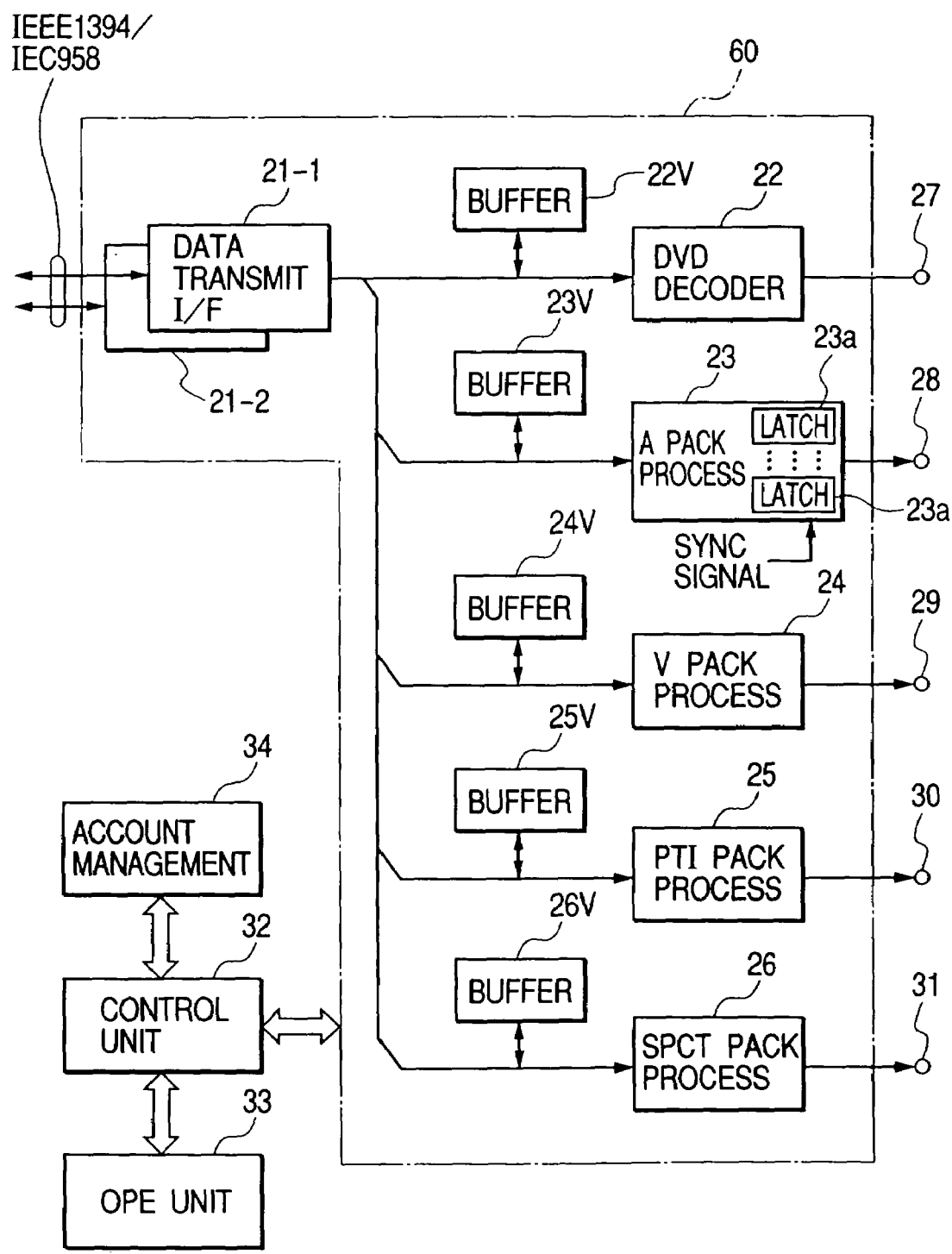
FIG. 22 is a block diagram of a recording and reproducing device according to a sixth embodiment of this invention.

FIG. 22 shows a recording and reproducing device according to a sixth embodiment of this invention. The recording and reproducing device in FIG. 22 can be used as the recording and reproducing device 200 in one of the first, second, third, and fourth embodiments of this invention.

As shown in FIG. 22, the recording and reproducing device includes a control unit 32 and an operation unit 33. The operation unit 33 is connected to the control unit 32. The control unit 32 includes a CPU. The control unit 32 is connected to an account management unit 34 and a signal processing unit 60.

The CPU 32 operates in accordance with a control program stored in an internal ROM. When the user actuates the operation unit 33 to request an operation mode (for example, a playback operation mode), the CPU 32 controls the signal processing unit 60 to implement the requested operation mode.

The signal processing unit 60 includes data transmission interfaces 21-1 and 21-2 which correspond to the data transmission interface 200b in FIG. 1 or the data transmission interface 200bb in FIG. 3. The data transmission interfaces 21-1 and 21-2 can receive data from the disc player 100 or 100A (see FIG. 1 or FIG. 3) via the IEEE1394 serial interfaces. The IEEE1394 serial interfaces may be replaced by the IEC958 serial interfaces.

The signal processing unit 60 includes a DVD decoder 22, an audio pack processor 23, a video pack processor 24, a real time information pack processor 25, and a still picture pack processor 26 which follow the data transmission interfaces 21-1 and 21-2. The signal processing unit 60 further includes buffers 22V, 23V, 24V, 25V, and 26V connected to the decoder and processors 22, 23, 24, 25, and 26 respectively.

The control unit 32 looks into a 4-bit pack flag, that is, a 4-bit signal type flag in application information within each real data header (see FIG. 13) of the data received by the data transmission interfaces 21-1 and 21-2. The control unit 32 operates to distribute the received data from the data transmission interfaces 21-1 and 21-2 to the buffers 22V, 23V, 24V, 25V, and 26V in accordance with the pack flag. Specifically, when the pack flag represents that the received data corresponds to an audio pack, the control unit 32 acts to transfer the received data from the data transmission interfaces 21-1 and 21-2 into the audio pack buffer 23V. When the pack flag represents that the received data corresponds to a video pack, the control unit 32 acts to transfer the received data from the data transmission interfaces 21-1 and 21-2 into the video pack buffer 24V. When the pack flag represents that the received data corresponds to a real time information pack, the control unit 32 acts to transfer the received data from the data transmission interfaces 21-1 and 21-2 into the real time information pack buffer 25V. When the pack flag represents that the received data corresponds to a still picture pack, the control unit 32 acts to transfer the received data from the data transmission interfaces 21-1 and 21-2 into the still picture pack buffer 26V. In the absence of an effective pack flag, the control unit 32 acts to transfer the received data from the data transmission interfaces 21-1 and 21-2 into the DVD buffer 22V.

The control unit 32 looks into contents ID information in management information within each real data tail (see FIGS. 13 and 14) of the received data. The control unit 32 identifies contents information in the received data by referring to the contents ID information. The control unit 32 controls the account management unit 34 to implement an account process in response to the result of the identification of the contents information.

Alternatively, the control unit 32 may look into an account flag in the application information within each real data header (see FIG. 13) of the received data. When the account flag represents that contents information in the received data corresponds to "paid", the control unit 32 controls the account management unit 34 to implement an account process.

The control unit 32 looks into user ID information in management information within each real data tail (see FIGS. 13 and 14) of the received data. The user ID information is designed for a specified user. The control unit 32 receives information of the present user from the operation unit 33. The control unit 32 decides whether or not the present user is equal to the specified user.

In the case where audio playback is requested by user's command inputted via the operation unit 33, the control unit 32 looks into a packed PCM flag in the management information within each real data tail (see FIGS. 13 and 14) of the received data. When the packed PCM flag is active, the control unit 32 controls the audio pack processor 23 to expand and decode audio data in the audio pack buffer 22V. Accordingly, it is possible to decide whether or not the audio data expansion should be done by referring to only the packed PCM flag rather than the whole of the received data. Thus, a high data reproduction efficiency is provided. In addition, a smaller buffer capacity suffices.

In the case where the disc player is incapable of executing audio data expansion, the control unit 32 controls the data transmission interfaces 21-1 and 21-2 to suspend the data reception.

The DVD decoder 22 accesses data in the buffer 22V, and decodes the accessed data into an original signal. The DVD decoder 22 outputs the original signal to a terminal 27. The original signal can be transmitted to an external device through the terminal 27.

The audio pack processor 23 accesses audio data in the buffer 23V, and processes and decodes the accessed audio data into an audio signal. The audio pack processor 23 outputs the audio signal to a terminal 28. The audio signal can be transmitted to an external device through the terminal 28.

The audio pack processor 23 includes latch circuits 23a corresponding to a left front channel Lf, a right front channel Rf, a surround channel S, a left surround channel Ls, a right surround channel Rs, a center channel C, and a low frequency effect channel LFE respectively. The audio pack processor 23 demultiplexes the accessed audio data into an Lf-channel audio data, an Rf-channel audio data, an S-channel audio data, an Ls-channel audio data, a Rs-channel audio data, a C-channel audio data, and an LFE-channel audio data. The audio pack processor 23 stores the Lf-channel audio data, the Rf-channel audio data, the S-channel audio data, the Ls-channel audio data, the Rs-channel audio data, the C-channel audio data, and the LFE-channel audio data into the corresponding latch circuits 23a, respectively. The Lf-channel audio data, the Rf-channel audio data, the S-channel audio data, the Ls-channel audio data, the Rs-channel audio data, the C-channel audio data, and the LFE-channel audio data are outputted from the latch circuits 23a to the terminal 28 as separate signals while being synchronized with each other in response to a sync signal.

The video pack processor 24 accesses video data in the buffer 24V, and processes and decodes the accessed video data into a video signal. The video pack processor 24 outputs the video signal to a terminal 29. The video signal can be transmitted to an external device through the terminal 29.

The real time information pack processor 25 accesses real time information data in the buffer 25V, and processes and decodes the accessed real time information data into a real time information signal. The real time information pack processor 25 outputs the real time information signal to a terminal 30. The real time information signal can be transmitted to an external device through the terminal 30.

The still picture pack processor 26 accesses still picture data in the buffer 26V, and processes and decodes the accessed still picture data into a still picture signal. The still picture pack processor 26 outputs the still picture signal to a terminal 31. The still picture signal can be transmitted to an external device through the terminal 31.

The 4-bit pack flag in the application information within each real data header (see FIG. 13) of the received data enables the disc player to immediately decode audio data, still picture data, real time information data, and video data. Thus, it is unnecessary to store a great amount of still picture data in the buffer 26V to synchronize played-back still picture information with played-back audio information. Accordingly, the synchronized-playback-related limitation on still pictures is eased. Furthermore, it is possible to simultaneously play back audio-added moving pictures and audio information.

The control unit 32 looks into a zero flag in the application information within each real data header (see FIG. 13) of the received data. When the zero flag is active, the control unit 32 controls the data transmission interfaces 21-1 and 21-2 to prevent the execution of a main-data receiving process.

The control unit 32 looks into a mute flag in the application information within each real data header (see FIG. 13) of the received data. When the mute flag is active, the control unit 32 controls the audio pack processor 23 to execute a muting process on audio data.

The control unit 32 extracts an account flag from the application information within each real data header (see FIG. 13) of the received data. In addition, the control unit 32 extracts allowed-use-term information (account information) and contents ID information from the management information within each real data tail (see FIGS. 13 and 14) of the received data. The control unit 32 transfers the account flag, the account information, and the contents ID information to the account management unit 34. The account flag, the account information, and the contents ID information are processed by the account management unit 34. Generally, SDCM information (copy management information) in the application information is unused.

Figure 23:
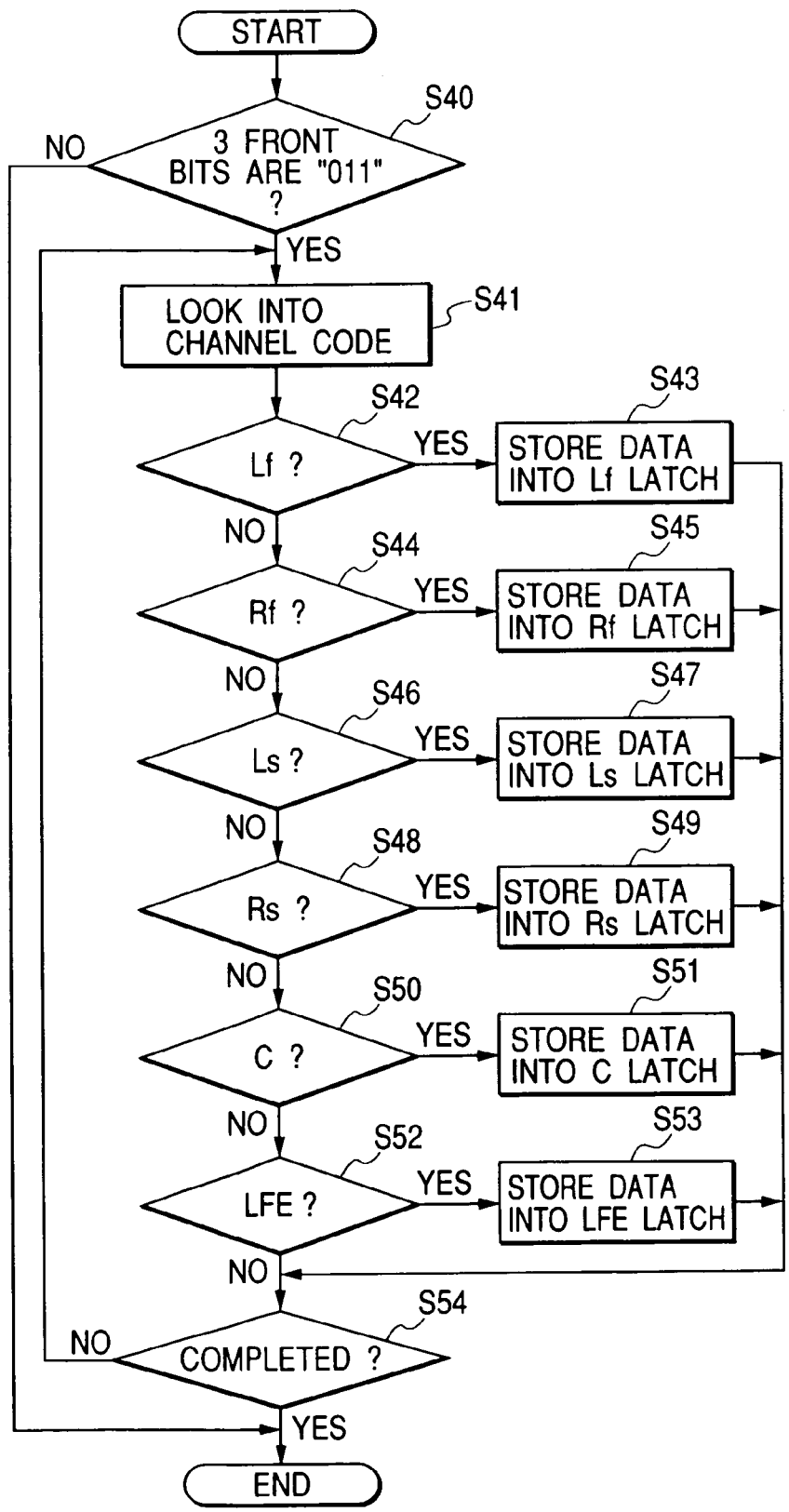
FIG. 23 is a flowchart of a segment of a control program for an audio pack processor in FIG. 22.

The audio pack processor 23 operates in accordance with a control program stored in its internal ROM. FIG. 23 is a flowchart of a segment of the control program which is executed for every 32-bit multiple-channel audio data in the format of FIG. 15.

As shown in FIG. 23, a first step S40 of the program segment decides whether or not three front bits of 32-bit incoming audio data are equal to "011". When the three front bits of the 32-bit incoming audio data are equal to "011", the program advances from the step S40 to a step S41. Otherwise, the program exits from the step S40 and then the current execution cycle of the program segment ends.

The step S41 detects a channel code in the 32-bit incoming audio data. After the step S41, the program advances to a step S42.

The step S42 decides whether or not the channel code corresponds to a left front channel Lf. When the channel code corresponds to the left front channel Lf, the program advances from the step S42 to a step S43. Otherwise, the program advances from the step S42 to a step S44.

The step S43 stores PCM audio data of the 32-bit incoming audio data into the latch circuit 32a corresponding to the left front channel Lf. After the step S43, the program advances to a step S54.

The step S44 decides whether or not the channel code corresponds to a right front channel Rf. When the channel code corresponds to the right front channel Rf, the program advances from the step S44 to a step S45. Otherwise, the program advances from the step S44 to a step S46.

The step S45 stores PCM audio data of the 32-bit incoming audio data into the latch circuit 32a corresponding to the right front channel Rf. After the step S45, the program advances to the step S54.

The step S46 decides whether or not the channel code corresponds to a left surround channel Ls. When the channel code corresponds to the left surround channel Ls, the program advances from the step S46 to a step S47. Otherwise, the program advances from the step S46 to a step S48.

The step S47 stores PCM audio data of the 32-bit incoming audio data into the latch circuit 32a corresponding to the left surround channel Ls. After the step S47, the program advances to the step S54.

The step S48 decides whether or not the channel code corresponds to a right surround channel Rs. When the channel code corresponds to the right surround channel Rs, the program advances from the step S48 to a step S49. Otherwise, the program advances from the step S48 to a step S50.

The step S49 stores PCM audio data of the 32-bit incoming audio data into the latch circuit 32a corresponding to the right surround channel Rs. After the step S49, the program advances to the step S54.

The step S50 decides whether or not the channel code corresponds to a center channel C. When the channel code corresponds to the center channel C, the program advances from the step S50 to a step S51. Otherwise, the program advances from the step S50 to a step S52.

The step S51 stores PCM audio data of the 32-bit incoming audio data into the latch circuit 32a corresponding to the center channel C. After the step S51, the program advances to the step S54.

The step S52 decides whether or not the channel code corresponds to a low frequency effect channel LFE. When the channel code corresponds to the low frequency effect channel LFE, the program advances from the step S52 to a step S53. Otherwise, the program advances from the step S52 to the step S54.

The step S53 stores PCM audio data of the 32-bit incoming audio data into the latch circuit 32a corresponding to the low frequency effect channel LFE. After the step S53, the program advances to the step S54.

The step S54 decides whether or not the channel-code-responsive process has been completed. When the channel-code-responsive process has been completed, the program exits from the step S54 and then the current execution cycle of the program segment ends. When the channel-code-responsive process has not been completed yet, the program returns from the step S54 to the step S41.

Figure 24:
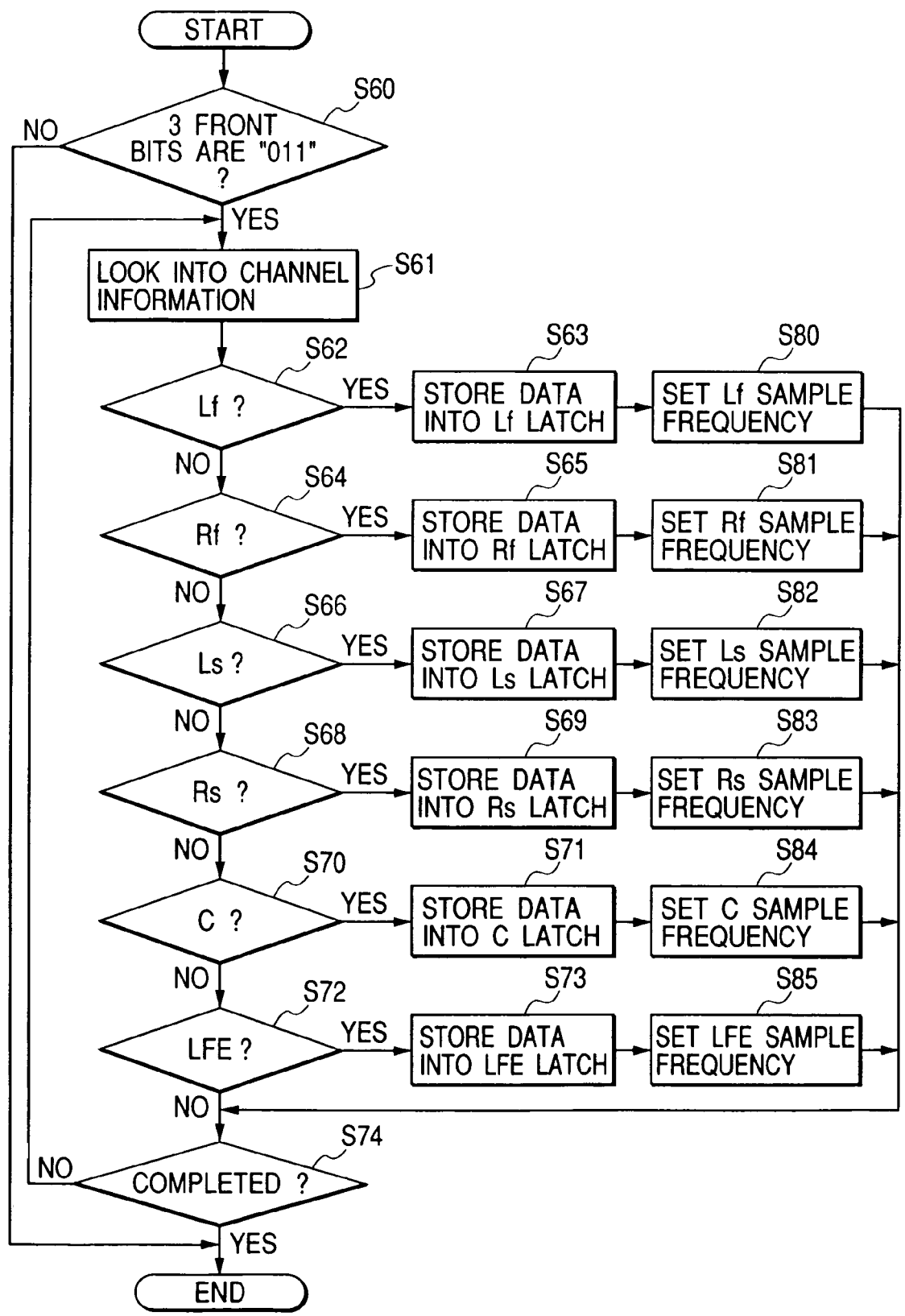
FIG. 24 is a flowchart of a program segment which can replace the program segment in FIG. 23.

FIG. 24 is a flowchart of a program segment which can replace the program segment in FIG. 23. The program segment in FIG. 24 is executed for every 32-bit multiple-channel audio data in the format of FIG. 20.

As shown in FIG. 24, a first step S60 of the program segment decides whether or not three front bits of 32-bit incoming audio data are equal to "011". When the three front bits of the 32-bit incoming audio data are equal to "011", the program advances from the step S60 to a step S61. Otherwise, the program exits from the step S60 and then the current execution cycle of the program segment ends.

The step S61 detects a 5-bit flag in the 32-bit incoming audio data. The step S61 detects channel assignment information (see FIG. 18) in the received data. The step S61 retrieves information of the order of the channels ACH0, ACH1, ACH2, ACH3, ACH4, and ACH5 (see FIG. 19). After the step S61, the program advances to a step S62.

The step S62 decides whether or not the 32-bit incoming audio data correspond to a left front channel Lf on the basis of the channel assignment information and the channel order information. When the 32-bit incoming audio data correspond to the left front channel Lf, the program advances from the step S62 to a step S63. Otherwise, the program advances from the step S62 to a step S64.

The step S63 stores PCM audio data of the 32-bit incoming audio data into the latch circuit 32a corresponding to the left front channel Lf.

A step S80 following the step S63 sets the value of the sampling frequency fs of the left front channel Lf in response to down sampling information represented by the three lower bits of the 5-bit flag. Specifically, the step S80 halves the sampling frequency fs when the down sampling information indicates the presence of down sampling. After the step S80, the program advances to a step S74.

The step S64 decides whether or not the 32-bit incoming audio data correspond to a right front channel Rf on the basis of the channel assignment information and the channel order information. When the 32-bit incoming audio data correspond to the right front channel Rf, the program advances from the step S64 to a step S65. Otherwise, the program advances from the step S64 to a step S66.

The step S65 stores PCM audio data of the 32-bit incoming audio data into the latch circuit 32a corresponding to the right front channel Rf.

A step S81 following the step S65 sets the value of the sampling frequency fs of the right front channel Rf in response to the down sampling information. Specifically, the step S81 halves the sampling frequency fs when the down sampling information indicates the presence of down sampling. After the step S81, the program advances to the step S74.

The step S66 decides whether or not the 32-bit incoming audio data correspond to a left surround channel Ls on the basis of the channel assignment information and the channel order information. When the 32-bit incoming audio data correspond to the left surround channel Ls, the program advances from the step S66 to a step S67. Otherwise, the program advances from the step S66 to a step S68.

The step S67 stores PCM audio data of the 32-bit incoming audio data into the latch circuit 32a corresponding to the left surround channel Ls.

A step S82 following the step S67 sets the value of the sampling frequency fs of the left surround channel Ls in response to the down sampling information. Specifically, the step S82 halves the sampling frequency fs when the down sampling information indicates the presence of down sampling. After the step S82, the program advances to the step S74.

The step S68 decides whether or not the 32-bit incoming audio data correspond to a right surround channel Rs on the basis of the channel assignment information and the channel order information. When the 32-bit incoming audio data correspond to the right surround channel Rs, the program advances from the step S68 to a step S69. Otherwise, the program advances from the step S68 to a step S70.

The step S69 stores PCM audio data of the 32-bit incoming audio data into the latch circuit 32a corresponding to the right surround channel Rs.

A step S83 following the step S69 sets the value of the sampling frequency fs of the right surround channel Rs in response to the down sampling information. Specifically, the step S83 halves the sampling frequency fs when the down sampling information indicates the presence of down sampling. After the step S83, the program advances to the step S74.

The step S70 decides whether or not the 32-bit incoming audio data correspond to a center channel C on the basis of the channel assignment information and the channel order information. When the 32-bit incoming audio data correspond to the center channel C, the program advances from the step S70 to a step S71. Otherwise, the program advances from the step S70 to a step S72.

The step S71 stores PCM audio data of the 32-bit incoming audio data into the latch circuit 32a corresponding to the center channel C.

A step S84 following the step S71 sets the value of the sampling frequency fs of the center channel C in response to the down sampling information. Specifically, the step S84 halves the sampling frequency fs when the down sampling information indicates the presence of down sampling. After the step S84, the program advances to the step S74.

The step S72 decides whether or not the 32-bit incoming audio data correspond to a low frequency effect channel LFE on the basis of the channel assignment information and the channel order information. When the 32-bit incoming audio data correspond to the low frequency effect channel LFE, the program advances from the step S72 to a step S73. Otherwise, the program advances from the step S72 to the step S74.

The step S73 stores PCM audio data of the 32-bit incoming audio data into the latch circuit 32a corresponding to the low frequency effect channel LFE.

A step S85 following the step S73 sets the value of the sampling frequency fs of the low frequency effect channel LFE in response to the down sampling information. Specifically, the step S85 halves the sampling frequency fs when the down sampling information indicates the presence of down sampling. After the step S85, the program advances to the step S74.

The step S74 decides whether or not the channel-assignment-responsive process has been completed. When the channel-assignment-responsive process has been completed, the program exits from the step S74 and then the current execution cycle of the program segment ends. When the channel-assignment-responsive process has not been completed yet, the program returns from the step S74 to the step S61.

Seventh Embodiment

A signal processing apparatus of a seventh embodiment of this invention is similar to the signal processing apparatus in FIG. 1 except for design changes indicated hereinafter. The signal processing apparatus of the seventh embodiment of this invention includes the disc player in FIG. 21 which replaces the disc player 100. It should be noted that the signal processing apparatus of the seventh embodiment of this invention may include the disc player 100.

The control unit 14 in the disc player of FIG. 21 can directly access the serial interfaces 188-1 and 188-2 (see FIG. 1). Alternatively, the control unit 14 can access the serial interfaces 188-1 and 188-2 via the data transmission interfaces 7-1, 7-2, 13-1, and 13-2. The control unit 14 is able to control the data transmission interfaces 7-1, 7-2, 13-1, and 13-2, and the serial interfaces 188-1 and 188-2.

Figure 25:
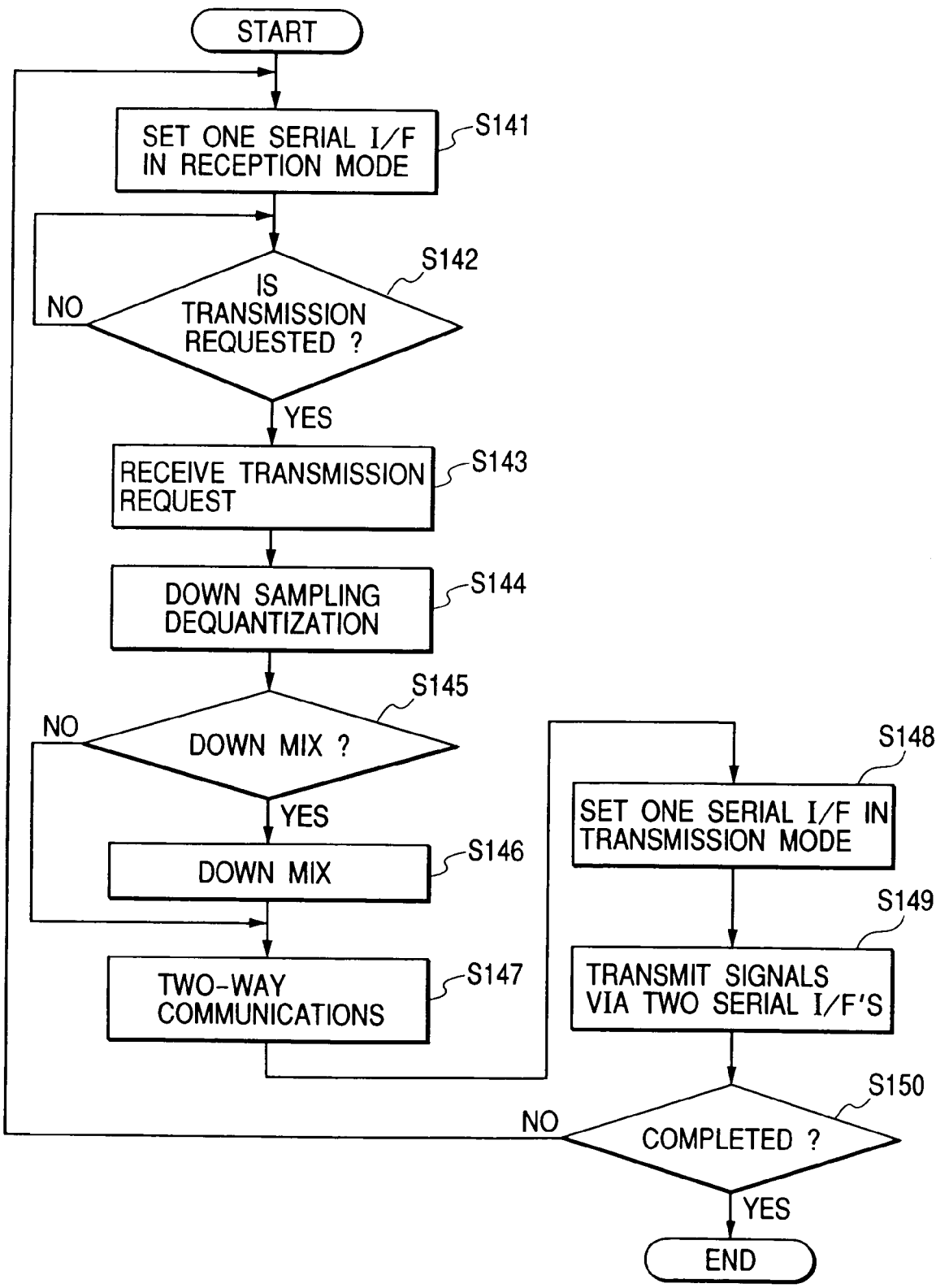
FIG. 25 is a flowchart of a segment of a control program for a control unit within a disc player in a seventh embodiment of this invention.

FIG. 25 is a flowchart of a segment of a control program for the control unit 14. With reference to FIG. 25, a first step S141 of the program segment sets the serial interface 188-1 in a receiving operation mode as viewed from the disc player. Furthermore, the step S141 sets the serial interface 188-2 in a transmitting operation mode as viewed from the disc player. After the step S141, the program advances to a step S142.

The step S142 decides whether or not transmission is requested by a recording and reproducing apparatus 200. When transmission is requested, the program advances from the step S142 to a step S143. Otherwise, the step S142 is repeated.

The step S143 receives a signal of the transmission request. A step S144 following the step S143 sets and controls the down sampler 10 (see FIG. 21) to implement a down sampling process. The step S144 sets and controls the audio signal processor 9 (see FIG. 21) to implement a dequantization process.

A step S145 subsequent to the step S144 decides whether or not a down mix process is required. When the down mix process is required, the program advances from the step S145 to a step S146. Otherwise, the program jumps from the step S145 to a step S147.

The step S146 sets and controls the down mixer 11 to implement the down mix process. After the step S146, the program advances to the step S147.

The step S147 implements two-way communications with the data transmission interface 200b (the recording and reproducing device 200) via the data transmission interfaces 7-1, 7-2, 13-1, and 13-2, and the serial interfaces 188-1 and 188-2. During the two-way communications, operation command signals such as a play command signal and a disc request signal are transmitted.

A step S148 subsequent to the step S147 changes the serial interface 188-1 to a transmitting operation mode as viewed from the disc player.

A step S149 following the step S148 transmits plural signals to the data transmission interface 200b (the recording and reproducing device 200) via the data transmission interfaces 7-1, 7-2, 13-1, and 13-2, and the serial interfaces 188-1 and 188-2. The plural signals include high-transfer-rate signals reproduced from a DVD-Audio. Examples of the high-transfer-rate signals are an audio signal, a real time information signal, and a still picture signal. The step S149 assigns the transmission of at least first one of the high-transfer-rate signals to the serial interface 188-1. The step S149 assigns the transmission of at least second one of the high-transfer-rate signals to the serial interface 188-2. For example, the transmission of an audio signal is assigned to the serial interface 188-1 while the transmission of a real time information signal and a still picture signal is assigned to the serial interface 188-2. In the case where the audio signal, the real time information signal, and the still picture signal are synchronously reproduced, the distributed signal transmission removes a significant limitation on a buffer capacity so that a lot of still pictures (for example, 80 to 99 still pictures) can be reproduced synchronously with audio information.

A step S150 subsequent to the step S149 decides whether or not the signal transmission has been completed. When the signal transmission has been completed, the program exits from the step S150 and then the current execution cycle of the program segment ends. When the signal transmission has not been completed yet, the program returns from the step S150 to the step S141.

The disc player sends various flags and copy-related information to the recording and reproducing device 200 as in the third embodiment of this invention. The various flags include an account flag, a zero flag, a mute flag, a pack flag (a pack type flag or a signal type flag), and a copy flag. The copy-related information includes a down sampling flag Fa, a down mix flag Fb, a dequantization flag Fc, and an information piece representing the number of times of copying (the copy generation number). It should be noted that a down mix flag and a dequantization flag may be sent in a way as in the fourth embodiment of this invention (see FIG. 18).

The controller within the recording and reproducing device 200 can access the data transmission interface 200b (see FIG. 1). The controller can access the serial interfaces 188-1 and 188-2 via the data transmission interface 200b. Alternatively, the controller can directly access the serial interfaces 188-1 and 1882. The controller is able to control the data transmission interface 200b and the serial interfaces 188-1 and 188-2.

Figure 26:
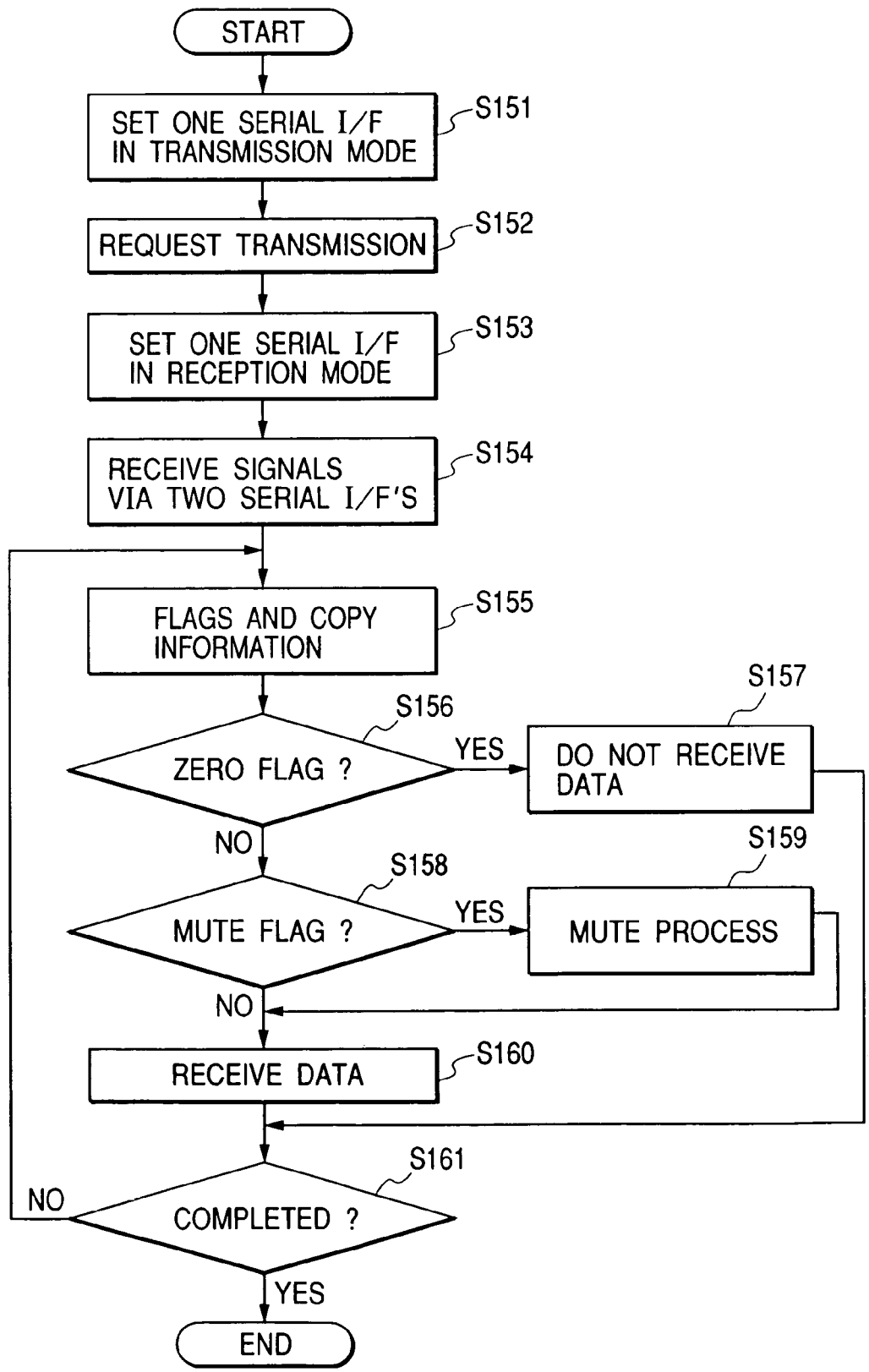
FIG. 26 is a flowchart of a segment of a control program for a controller within a recording and reproducing device in the seventh embodiment of this invention.

FIG. 26 is a flowchart of a segment of a control program for the controller within the recording and reproducing device 200. With reference to FIG. 26, a first step S151 of the program segment sets the serial interface 188-1 in a transmitting operation mode as viewed from the recording and reproducing device 200. Furthermore, the step S151 sets the serial interface 188-2 in a receiving operation mode as viewed from the recording and reproducing device 200.

A step S152 following the step S151 requests transmission of the disc player by using the serial interface 188-1. The step S152 may implement an authentication process as follows. The step S152 receives authentication data from the disc player via the serial interface 188-2 after transmission has been requested. The step S152 generates an authentication response signal when receiving the authentication data. The step S152 sends the authentication response signal to the disc player via the serial interface 188-1. In the case where the authentication response signal represents that the recording and reproducing device 200 is authorized to make a copy of main data, the disc player starts the transmission of main data (contents information).

A step S153 subsequent to the step S152 changes the serial interface 188-1 to a receiving operation mode as viewed from the recording and reproducing device 200.

A step S154 following the step S153 receives signals from the disc player via the serial interfaces 188-1 and 188-2. After the step S154, the program advances to a step S155.

The step S155 detects received flags and received copy-related information. The step S155 looks into an account flag among the detected flags. When the account flag represents that contents information corresponds to "paid", the step S155 refers to a received copy-related information piece representative of the number of times of copying and determines a charge in response to the number of times of copying. Then, the step S155 executes account management including a process of electronically paying the charge from an electronic purse provided in the reception side.

A step S156 following the step S155 decides whether or not a zero flag of "1" is received. When a zero flag of "1" is received, the program advances from the step S156 to a step S157. Otherwise, the program advances from the step S156 to a step S158.

The step S157 prevents a main-data receiving process from being executed. After the step S157, the program advances to a step S161.

The step S158 decides whether or not a mute flag of "1" (or mute flags of "1") is received. When a mute flag of "1" is received, the program advances from the step S158 to a step S159. Otherwise, the program advances from the step S158 to a block S160.

The step S159 executes a muting process on a signal received via the serial interface related to the mute flag of "1". After the step S159, the program advances to the block S160.

The block S160 looks into a signal type flag (a pack flag) among the received flags, and executes the main-data receiving process in response to the signal type flag. After the block S160, the program advances to the step S161. The block S160 is similar to the block S26 in FIGS. 5 and 6.

The step S161 decides whether or not the reception of the main data has been completed. When the reception of the main data has been completed, the program exits from the step S161 and then the current execution cycle of the program segment ends. When the reception of the main data has not been completed yet, the program returns from the step S161 to the step S155.

The recording and reproducing device 200 notifies the disc player of the completion of the reception of the main data, that is, the completion of copying the main data. The disc player updates or counts up the number of times of copying, which is represented by the piece of the copy-related information, in response to the notice from the recording and reproducing device 200.

Eighth Embodiment

An eighth embodiment of this invention is similar to one of the first, second, third, fourth, and seventh embodiments thereof except for design changes indicated hereinafter. According to the eighth embodiment of this invention, PCM audio data in FIG. 7 or FIG. 8 are replaced by audio data resulting from a 1-bit DSD encoding process. Here, DSD is short for "Direct Stream Digital".

Figure 27:
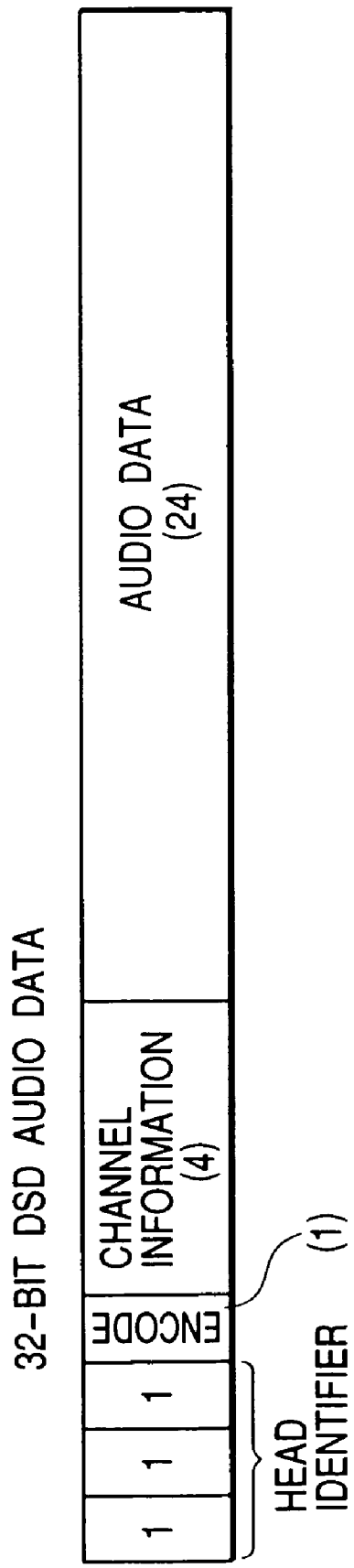
FIG. 27 is a diagram of a format of 32-bit audio data in an eighth embodiment of this invention which is used instead of the 32-bit audio data format in FIG. 15 or FIG. 20.

The eighth embodiment of this invention uses a 32-bit audio data format in FIG. 27 which replaces the 32-bit audio data format in FIG. 15 or FIG. 20. The eighth embodiment of this invention may use a data format conforming to the SACD (super audio CD) standards. With reference to FIG. 27, 32-bit audio data have a sequence of a 3-bit head identifier "111", a 1-bit encoding-related flag, 4-bit channel bit information, and 24-bit DSD audio data. The encoding-related flag represents whether lossless encoding (for example, compressive lossless encoding or Huffman encoding) is used or not in connection with the DSD audio data. The channel bit information is divided into 2-bit channel-number information and 2-bit bit-number information. The channel-number information being "00" indicates two channels. The channel-number information being "01" indicates three channels. The channel-number information being "10" indicates six channels. The channel-number information being "11" indicates another number of channels. The bit-number information represents the number of bits composing each audio information sample.

It should be noted that a DSD flag corresponding to the DSD head identifier "111" may be placed in the reserved area of the management information in FIG. 14.

Figure 28:
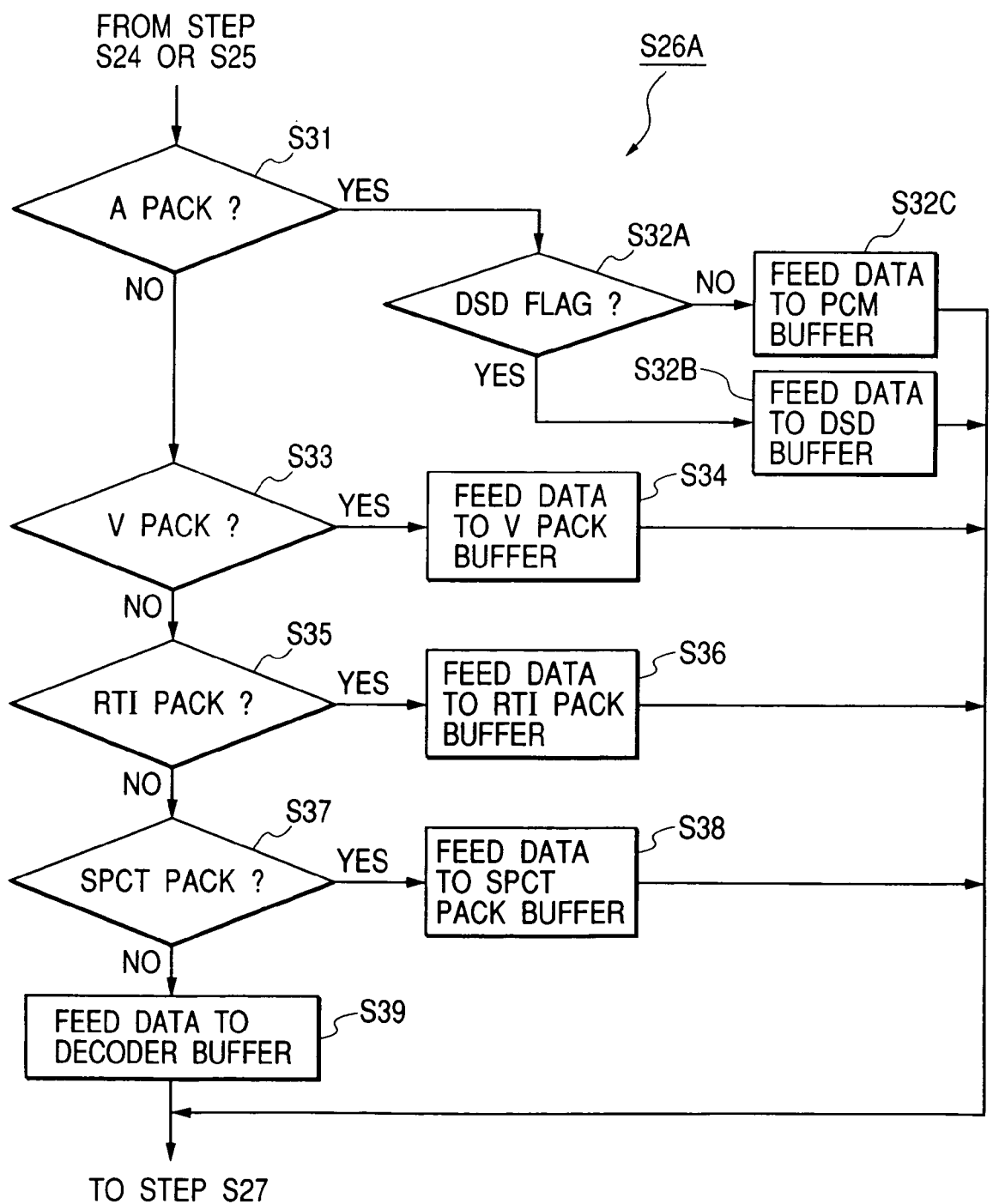
FIG. 28 is a flowchart of a program block which substitutes for the program block in FIG. 6.

The eighth embodiment of this invention uses a block S26A in FIG. 28 which is a modification of the block S26 in FIGS. 5 and 6. With reference to FIG. 28, a first step S31 in the block S26A decides whether or not the signal type flag corresponds to an audio signal (a DVD-Audio audio pack). When the signal type flag corresponds to an audio signal, the program advances from the step S31 to a step S32A. Otherwise, the program advances from the step S31 to a step S33.

The step S32A decides whether or not an active DSD flag (or a DSD head identifier) is present. When the active DSD flag is present, the program advances from the step S32A to a step S32B. Otherwise, the program advances from the step S32A to a step S32C.

The step S32B feeds a received signal (the received main data) to a buffer assigned to DSD audio data and provided in the reception side. After the step S32B, the program jumps to the step S27 (see FIG. 5).

The step S32C feeds a received signal (the received main data) to a buffer assigned to PCM audio data and provided in the reception side. After the step S32C, the program jumps to the step S27 (see FIG. 5).

Figure 29:
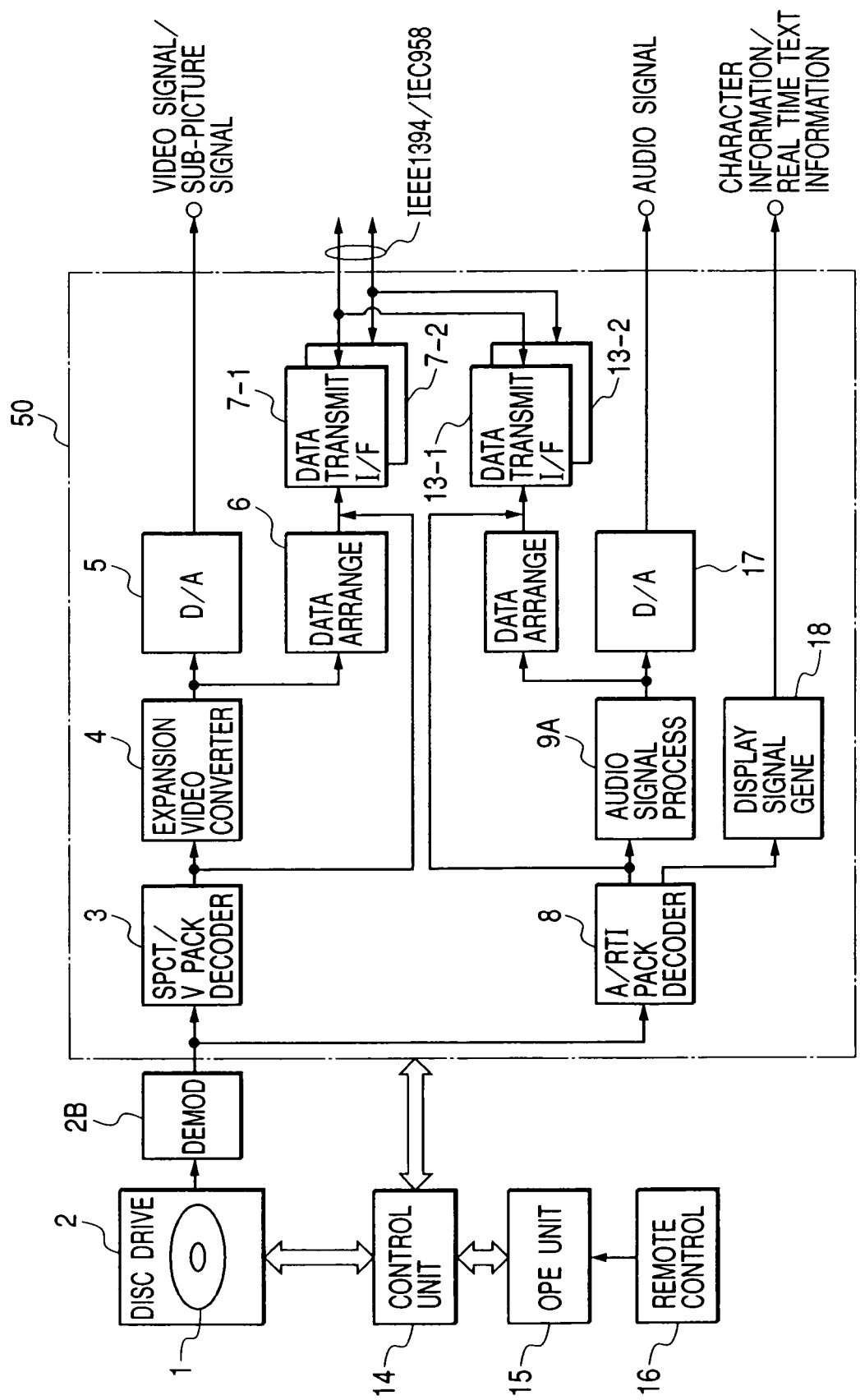
FIG. 29 is a block diagram of a disc player in the eighth embodiment of this invention.

The eighth embodiment of this invention includes a disc player of FIG. 29 which is a modification of the disc player in FIG. 21. The disc player of FIG. 29 includes an audio signal processor 9A instead of the audio signal processor 9 (see FIG. 21).

With reference to FIG. 29, the audio signal processor 9A is controlled by a control unit 14 in response to a DSD flag (or a DSD head identifier). In the case where a DSD flag is active, the audio signal processor 9A subjects an audio data stream to a DSD conversion process and thereby converts the audio data stream into a DSD audio signal. The audio signal processor 9A outputs the DSD audio signal to a data arranger 12 and a D/A converter 17. In the case where the DSD flag is inactive, the audio signal processor 9A subjects an audio data stream to a PCM conversion process and thereby converts the audio data stream into a PCM audio signal. The audio signal processor 9A outputs the PCM audio signal to the data arranger 12 and the D/A converter 17.

The D/A converter 17 changes the DSD audio signal or the PCM audio signal into a corresponding analog audio signal. The analog audio signal can be transmitted from the D/A converter 17 to an external loudspeaker. In this case, the analog audio signal is converted into corresponding sounds by the external loudspeaker.

The data arranger 12 subjects the output signal of the audio signal processor 9A to a data arranging process, thereby converting the output signal of the audio signal processor 9A into an arrangement-resultant digital audio signal. The data arranger 12 outputs the arrangement-resultant digital audio signal to data transmission interfaces 13-1 and 13-2.

Figure 30:
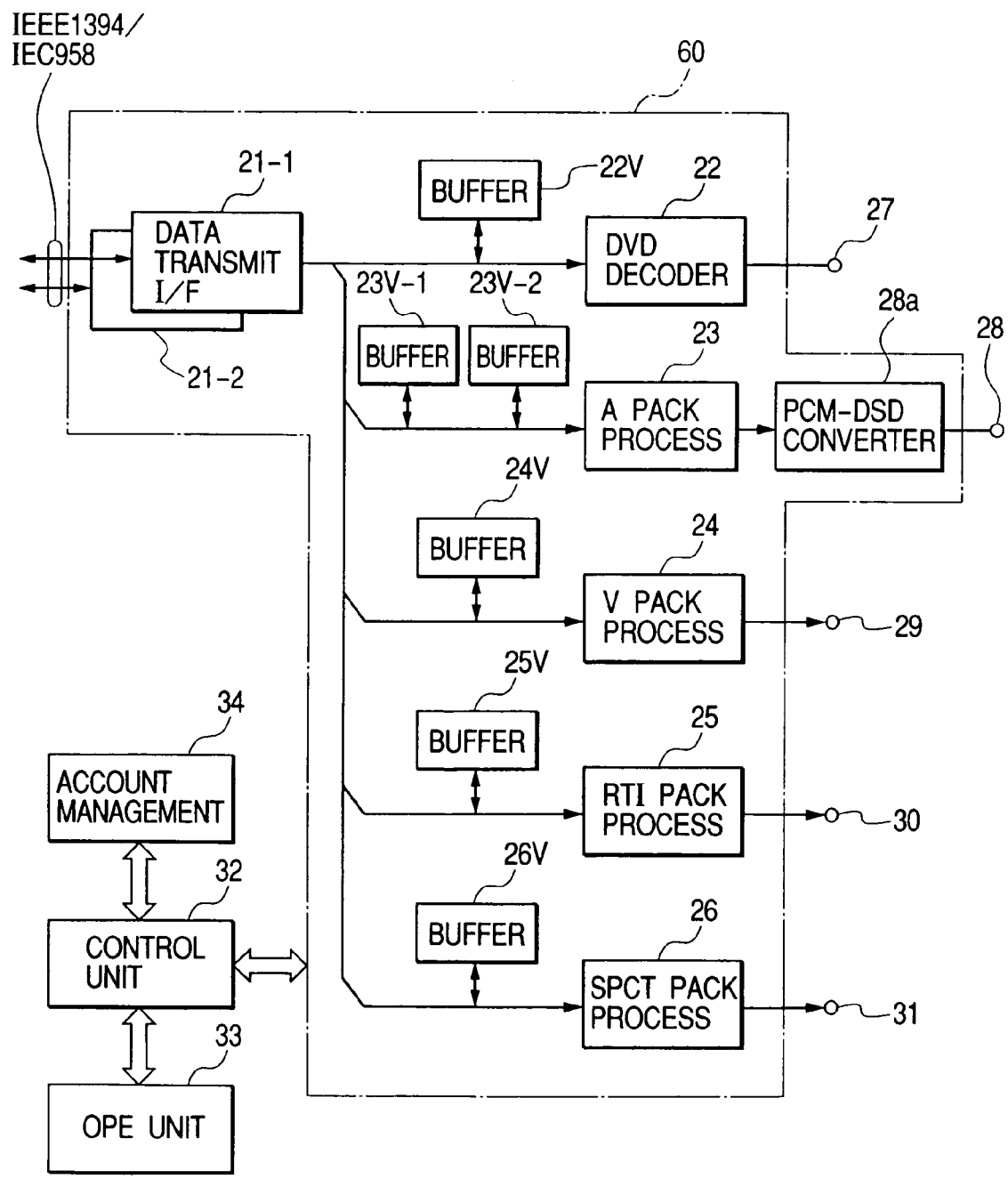
FIG. 30 is a block diagram of a recording and reproducing device in the eighth embodiment of this invention.

The eighth embodiment of this invention includes a recording and reproducing device of FIG. 30 which is a modification of the recording and reproducing device in FIG. 22. The recording and reproducing device of FIG. 30 includes a PCM-DSD converter 28a connected between an audio pack processor 23 and a terminal 28. The recording and reproducing device of FIG. 30 includes buffers 23V-1 and 23V-2 instead of the buffer 23V (see FIG. 22). The buffers 23V-1 and 23V-2 are connected to the audio pack processor 23. The buffer 23V-1 is assigned to DSD audio data. The buffer 23V-2 is assigned to PCM audio data.

With reference to FIG. 30, a control unit 32 operates to distribute the received data from data transmission interfaces 21-1 and 21-2 to buffers 22V, 24V, 25V, and 26V and the buffers 23V-1 and 23V-2 in accordance with a pack flag and a head identifier in each 32-bit audio data. Specifically, when the pack flag represents that the received data corresponds to an audio pack and the head identifier is "111", the control unit 32 acts to transfer the received data from the data transmission interfaces 21-1 and 21-2 into the DSD buffer 23V-1. When the pack flag represents that the received data corresponds to an audio pack and the head identifier is "011", the control unit 32 acts to transfer the received data from the data transmission interfaces 21-1 and 21-2 into the PCM buffer 23V-2.

During playback, the PCM-DSD converter 28a receives audio data from the buffer 23V-1 or 23V-2 via the audio pack processor 23. The PCM-DSD converter 28a changes the audio data into a corresponding PCM or DSD signal. The PCM-DSD converter 28a outputs the PCM or DSD signal to the terminal 28.

Figure 31:
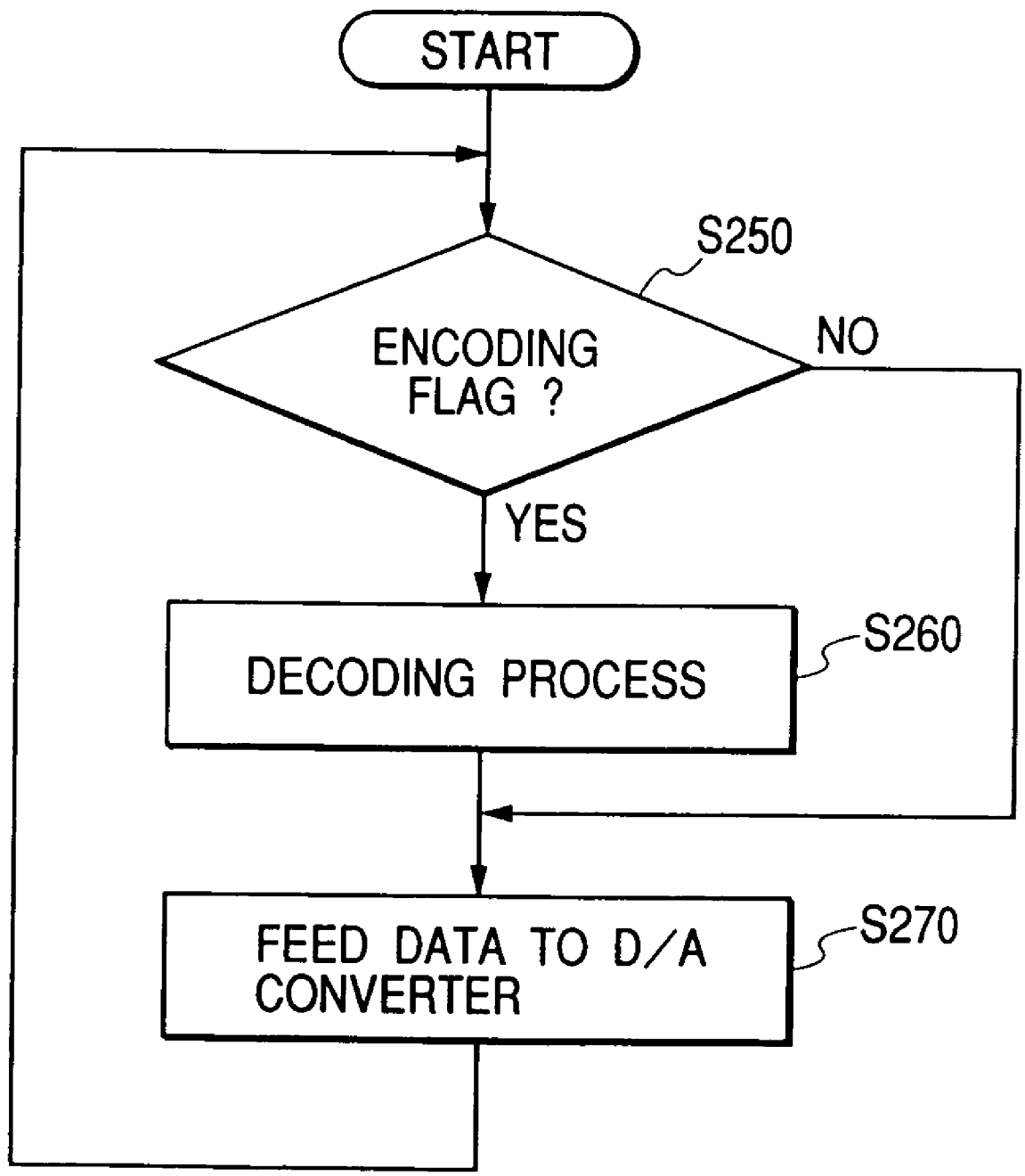
FIG. 31 is a flowchart of a segment of a control program for a PCM-DSD converter in FIG. 30.

The PCM-DSD converter 28a includes a processor which operates in accordance with a control program stored in its internal ROM. FIG. 31 is a flowchart of a segment of the control program whose one cycle is executed for every 32-bit audio data in the format of FIG. 27.

As shown in FIG. 31, a first step S250 of the program segment decides whether or not an active encoding-related flag is present. When an active encoding-related flag is present, the program advances from the step S250 to a step S260. Otherwise, the program jumps from the step S250 to a step S270.

The step S260 expands and decodes lossless-compression-resultant audio data to recover original audio data. After the step S260, the program advances to the step S270.

The step S270 feeds the audio data generated by the step S260 or the audio data unprocessed by the step S260 to a D/A converter (not shown). After the step S270, the program returns to the step S250.

Other Embodiments

Each of the first, second, third, fourth, seventh, and eighth embodiments of this invention may be modified to include only one IEEE 1394 serial interface for two-way communications.

In each of the first, second, third, fourth, fifth, seventh, and eighth embodiments of this invention, the disc player may be replaced by an HDD (hard disc drive) device.

In each of the first, second, third, fourth, sixth, seventh, and eighth embodiments of this invention, the recording and reproducing device may be replaced by a portable terminal device or a mobile terminal device.

What is claimed:

1. A signal processing apparatus comprising:
    decoding means for decoding audio data in input data into a PCM digital audio signal of a prescribed number of multiple channels separated into a first channel group and a second channel group according to assignment of the multiple channels to the first channel group and the second channel group, the audio data conforming with a prescribed encoding scheme, the input data being formed with prescribed audio packs containing the audio data, the audio data having information about the assignment of the multiple channels and having information about a sampling frequency for the first channel group and information about a sampling frequency for the second channel group, the audio data resulting from encoding inclusive of loss-less compression in conformity with the DVD-Audio standards; and
    packeting processing means for making packets in a format of a prescribed protocol, each of the packets having a packet header and a data field;
    wherein the packeting processing means comprises:
    1) means for placing the information about the assignment of the multiple channels, the information about the sampling frequency for the first channel group, and the information about the sampling frequency for the second channel group in a prescribed area in a real-data recording area except a CIP (Common Isochronous Packet) header in the data field, and also placing at least one of a down sampling flag, a down mix flag, and a dequantization flag in the prescribed area; and
    2) means for placing bit length information representative of an effective bit length of a segment of the PCM digital audio signal at a position adjacently preceding the segment of the PCM digital audio signal as an identifier for the segment of the PCM digital audio signal in the real-data recording area.

2. A signal processing apparatus as recited in claim 1, wherein the down sampling flag represents that a prescribed sampling frequency is halved.

3. A signal processing apparatus as recited in claim 1, wherein the assignment of the multiple channels is changeable among predetermined different states determining which of the multiple channels are assigned to the first channel group and which of the multiple channels are assigned to the second channel group.

4. A signal processing apparatus as recited in claim 1, wherein the bit length information indicates which of 24 bits, 20 bits, and 16 bits the effective bit length of the segment of the PCM digital audio signal is equal to.

5. A signal processing method comprising the steps of:
decoding audio data in input data into a PCM digital audio signal of a prescribed number of multiple channels separated into a first channel group and a second channel group according to assignment of the multiple channels to the first channel group and the second channel group, the audio data conforming with a prescribed encoding scheme, the input data being formed with prescribed audio packs containing the audio data, the audio data having information about the assignment of the multiple channels and having information about a sampling frequency for the first channel group and information about a sampling frequency for the second channel group, the audio data resulting from encoding inclusive of loss-less compression in conformity with the DVD-Audio standards; and
making packets in a format of a prescribed protocol, each of the packets having a packet header and a data field;
wherein the packet making step comprises:
1) placing the information about the assignment of the multiple channels, the information about the sampling frequency for the first channel group, and the information about the sampling frequency for the second channel group in a prescribed area in a real-data recording area except a CIP (Common Isochronous Packet) header in the data field, and also placing at least one of a down sampling flag, a down mix flag, and a dequantization flag in the prescribed area; and
2) placing bit length information representative of an effective bit length of a segment of the PCM digital audio signal at a position adjacently preceding the segment of the PCM digital audio signal as an identifier for the segment of the PCM digital audio signal in the real-data recording area.

6. A signal processing method as recited in claim 5, wherein the down sampling flag represents that a prescribed sampling frequency is halved.

7. A signal processing method as recited in claim 5, wherein the assignment of the multiple channels is changeable among predetermined different states determining which of the multiple channels are assigned to the first channel group and which of the multiple channels are assigned to the second channel group.

8. A signal processing method as recited in claim 5, wherein the bit length information indicates which of 24 bits, 20 bits, and 16 bits the effective bit length of the segment of the PCM digital audio signal is equal to.

9. A signal receiving method comprising the steps of:
decoding audio data in input data into a PCM digital audio signal of a prescribed number of multiple channels separated into a first channel group and a second channel group according to assignment of the multiple channels to the first channel group and the second channel group, the audio data conforming with a prescribed encoding scheme, the input data being formed with prescribed audio packs containing the audio data, the audio data having information about the assignment of the multiple channels and having information about a sampling frequency for the first channel group and information about a sampling frequency for the second channel group, the audio data resulting from encoding inclusive of loss-less compression in conformity with the DVD-Audio standards;
making packets in a format of a prescribed protocol, each of the packets having a packet header and a data field;
wherein the packet making step comprises:
1) placing the information about the assignment of the multiple channels, the information about the sampling frequency for the first channel group, and the information about the sampling frequency for the second channel group in a prescribed area in a real-data recording area except a CIP (Common Isochronous Packet) header in the data field, and also placing at least one of a down sampling flag, a down mix flag, and a dequantization flag in the prescribed area; and
2) placing bit length information representative of an effective bit length of a segment of the PCM digital audio signal at a position adjacently preceding the segment of the PCM digital audio signal as an identifier for the segment of the PCM digital audio signal in the real-data recording area;
receiving the packets made by the packet making step; and
decoding the channel information for identifying the respective channels for the PCM digital audio signal which is in the packets received by the receiving step.

10. A signal receiving method as recited in claim 9, wherein the down sampling flag represents that a prescribed sampling frequency is halved.

11. A signal receiving method as recited in claim 9, wherein the assignment of the multiple channels is changeable among predetermined different states determining which of the multiple channels are assigned to the first channel group and which of the multiple channels are assigned to the second channel group.

12. A signal receiving method as recited in claim 9, wherein the bit length information indicates which of 24 bits, 20 bits, and 16 bits the effective bit length of the segment of the PCM digital audio signal is equal to.

* * * * *